United States Patent
DeRudder et al.

[11] Patent Number: 5,840,802
[45] Date of Patent: Nov. 24, 1998

[54] DUAL GRAFT STAGE AND THERMALLY STABILIZED POLYORGANOSILOXANE/ POLYVINYL-BASED GRAFT COPOLYMERS AND THERMOPLASTIC COMPOSITIONS CONTAINING THE SAME

[75] Inventors: James Louis DeRudder, Mt. Vernon, Ind.; I-Chung Wayne Wang, Vienna, W. Va.

[73] Assignee: General Electric Company, Pittsfield, Mass.

[21] Appl. No.: 775,789

[22] Filed: Oct. 11, 1991

[51] Int. Cl.⁶ .................................................. C08L 51/08
[52] U.S. Cl. ............................... 525/63; 525/66; 525/67; 525/68; 525/72; 525/100; 525/104; 525/105; 525/421; 525/439; 525/445; 525/446; 525/464; 525/475
[58] Field of Search ................................ 525/63, 67, 479, 525/66, 68, 72, 100, 104, 105, 421, 439, 446, 445, 464

[56] References Cited

U.S. PATENT DOCUMENTS

| | | | |
|---|---|---|---|
| 4,690,986 | 9/1987 | Sasaki et al. | 525/479 |
| 4,775,712 | 10/1988 | Sasaki et al. | 524/504 |
| 4,902,742 | 2/1990 | Yamamoto et al. | 525/63 |
| 4,918,132 | 4/1990 | Hongo et al. | 524/504 |
| 4,927,880 | 5/1990 | DeRudder et al. | 525/63 |
| 4,939,205 | 7/1990 | DeRudder et al. | 525/63 |
| 4,939,206 | 7/1990 | Wang | 525/63 |
| 4,968,746 | 11/1990 | DeRudder et al. | 525/63 |

FOREIGN PATENT DOCUMENTS

| | | |
|---|---|---|
| 0246537 | 11/1987 | European Pat. Off. . |
| 0206552 | 3/1988 | European Pat. Off. . |
| 0369199 | 5/1990 | European Pat. Off. . |
| 0369202 | 5/1990 | European Pat. Off. . |
| 0369203 | 5/1990 | European Pat. Off. . |
| 0369204 | 5/1990 | European Pat. Off. . |

OTHER PUBLICATIONS

Modern Plastics Encyclopedia, 1983–1984, pp. 41 & 46.

*Primary Examiner*—Ralph H. Dean

[57] ABSTRACT

Low temperature ductile and impact resistant compositions are provided which comprise a polycarbonate resin and a dual graft multi-stage polyorganosiloxane/polyvinyl-based graft polymer composition. Also provided are thermally stabilized multi-stage polyorganosiloxane/polyvinyl-based graft polymers which have improved color-imparting and impact resistance-imparting properties and thermoplastic compositions containing the same.

15 Claims, 2 Drawing Sheets

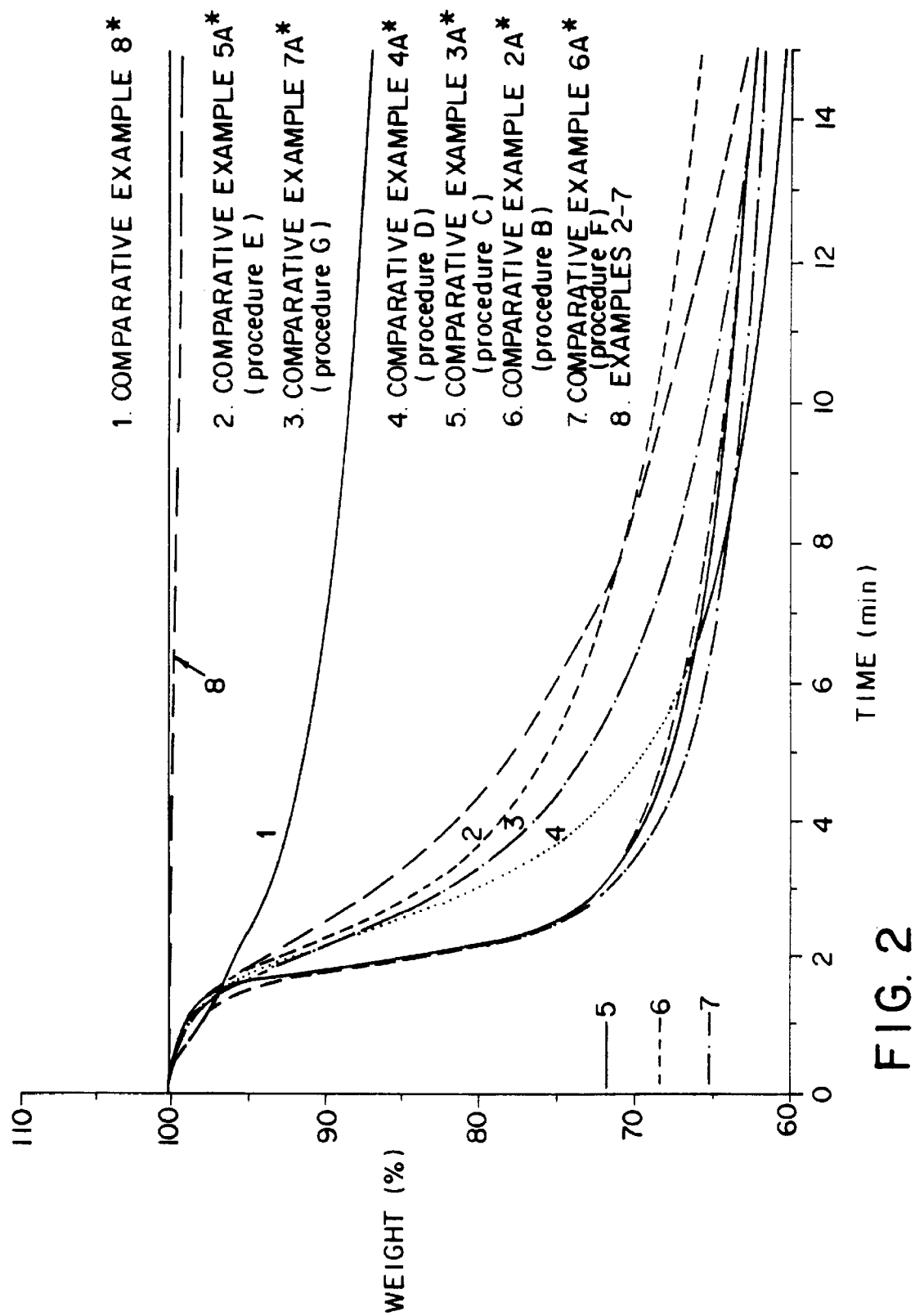

DUAL GRAFT STAGE AND THERMALLY STABILIZED POLYORGANOSILOXANE/ POLYVINYL-BASED GRAFT COPOLYMERS AND THERMOPLASTIC COMPOSITIONS CONTAINING THE SAME

FIELD OF THE INVENTION

The invention relates to low temperature ductile and impact resistant polyorganosiloxane/polyvinyl-based dual graft polymer modified polycarbonate resin compositions and to thermally stabilized polyorganosiloxane/polyvinyl-based graft polymers, a process for producing such thermally stabilized multi-stage graft polymers and thermoplastic compositions incorporating such thermally stabilized multi-stage graft polymers.

Novel low temperature ductile and impact resistant polycarbonate resin compositions modified with polyorganosiloxane/polyvinyl-based rubber products comprising a co-homopolymerized polyorganosiloxane/polyvinyl first stage substrate, a poly(alkyl (meth)acrylate) second stage grafted to the substrate and a poly(alkenyl aromatic) third stage subsequently grafted thereto are provided. These resin compositions exhibit enhanced ductility and impact strength, particularly at low temperature.

Additionally, novel polyorganosiloxane/polyvinyl-based rubber products which have been thermally stabilized by superdrying are provided which comprise a co-homopolymerized polyorganosiloxane/polyvinyl-based substrate and one or more grafted or molecularly interlocked subsequent stages comprising a vinyl-type polymer such as a styrene/acrylonitrile copolymer and/or an acrylate or (meth)acrylate polymer. Compounded thermoplastic resins containing the thermally stabilized or superdried polyorganosiloxane/polyvinyl-based graft polymers are also provided.

These thermally stabilized rubbers and resin compositions exhibit dramatically improved thermal stability, particularly when subjected to abusive molding conditions such as 640° F. molding temperatures for a two minute cycle time, over rubbers and compositions prepared with a polyorganosiloxane/polyvinyl-based modifier that has not been superdried. The thermally stabilized rubber modified compositions of the present invention also exhibit improved color and impact properties.

BACKGROUND OF THE INVENTION

Novel polyorganosiloxane/polyvinyl-based three stage graft polymers have been discovered which improve the low temperature ductility and impact resistance of polycarbonate resins. Additionally, thermally stabilized polyorganosiloxane/polyvinyl-based graft polymers which are extremely useful in improving color and impact properties of thermoplastic resins, particularly under abusive molding conditions, are disclosed.

There have been many attempts in the art to provide polyorganosiloxane-based graft polymers which may be useful as modifiers for thermoplastic resins.

Major deficiencies of such materials include relatively poor properties at extremes such as at low temperature or under abusive molding conditions.

Commonly-owned European Patent Application No. 0,369,204 (U.S. Ser. No. 07/271,250, filed Nov. 14, 1988), now U.S. Pat. No. 5,045,595 U.S. Pat. No. 4,939,205 and U.S. Pat. No. 4,927,880 disclose polyorganosiloxane/polyvinyl-based graft polymer modifiers, and particularly three stage polyorganosiloxane/polyvinyl-based modifiers including those having a butylacrylate intermediate stage and a styrene/acrylonitrile outermost stage, as being useful in the modification of polycarbonates, polyesters, and polycarbonates and polyesters along with other thermoplastic resins. U.S. Pat. No. 4,968,746 to DeRudder and Wang, also commonly-owned, discloses polyesters in combination with the above modifiers.

Polyorganosiloxane/polyvinyl-based and particularly polyorganosiloxane/polyvinyl-based polybutylacrylate/styrene modifiers are combined with polyphenylene ether or polyphenylene ether and polystyrene in commonly-owned European Patent Application No. 0,369,199 (U.S. Ser. No. 07/271,249, filed Nov. 14, 1988).

Commonly-owned European Patent Application Nos. 369,202 and 369,203 (respectively U.S. Ser. Nos. 07/271,247 and 07/271,248, both filed Nov. 14, 1988 now U.S. Pat. Nos. 5,087,622 and 5,106,908) include polyorganosiloxane/polyvinyl-based graft polymers with a methyl (meth)acrylate outermost stage. These modifiers can be combined with polycarbonates and/or polyesters.

Polycarbonates and polyesters are also modified with a combination of polyorganosiloxane; organosiloxane; and/or diene rubber-based modifiers in commonly-owned U.S. patent application Ser. No. 07/271,246, filed Nov. 14, 1988 now U.S. Pat. No. 5,025,066, and U.S. patent application Ser. No. 07/356,356, filed May 24, 1989 now U.S. Pat. No. 5,079,293.

Finally, Wang, U.S. Pat. No. 4,939,206, incorporates flame retardant polyorganosiloxane-based modifiers having either organosiloxane or co-homopolymerized polyorganosiloxane/polyvinyl-based substrates and a flame retardant graft stage with thermoplastic resins.

DeRudder et al, U.S. Pat. No. 4,927,880, disclose thermoplastic resins including aromatic polycarbonate resins and aromatic polyesters in combination with a flatting agent comprising a polyorganosiloxane/polyvinyl-based graft polymer including poly(butylacrylate)-styrene/acrylonitrile multi-graft stages.

Hongo et al, U.S. Pat. No. 4,918,132, suggest the addition of a thermoplastic polyester, a polyorganosiloxane/poly(methyl (meth)acrylate)-based-vinyl graft copolymer, a thermoplastic polyester elastomer and a filler to improve impact resistance of polyesters.

The impact resistance and thermal resistance of polymethacrylimide resins is stated by Yamamoto et al, U.S. Pat. No. 4,902,742, to be improved by the addition of a modifier formed by graft-polymerizing at least one ethylenically unsaturated monomer onto a polyorganosiloxane rubber copolymerized with a graft-crosslinking agent.

Sasaki et al, U.S. Pat. No. 4,775,712, suggest the addition of a polyester elastomer, a polyorganosiloxane-vinyl graft polymer modifier and a filler to improve impact properties and weatherability of polyesters.

A similar modifier comprising a vinyl monomer grafted to a organosiloxane, units from a specific graft-linking agent, and a tetrafunctional cross-linking agent is disclosed by Sasaki et al, U.S. Pat. No. 4,690,986.

Mention is also made of European Patent Application Nos. 0,246,537 and 0,260,552, both of which describe the use as impact modifiers of a polyorganosiloxane polymer substrate on which are subsequently grafted first and second vinyl-based polymer stages. The latter of said applications describes soaking the first stage substrate with second stage monomer(s) to cause entangling with the silicone prior to the subsequent polymerization of the second stage. This forms a traditional interpenetrating network.

The co-homopolymerized polyorganosiloxane/polyvinyl-based dual graft modifiers and the thermally stabilized co-homopolymerized polyorganosiloxane/polyvinyl-based graft modifiers of the present invention are useful in applications requiring superior properties at extremes, particularly at low temperature and abusive molding conditions, and particularly in combination with thermoplastic resins.

BRIEF DESCRIPTION OF THE DRAWINGS

FIG. 2 is a graphic illustration of the increase in melt stability that thermally stabilized multi-stage polyorganosiloxane/polyvinyl-based graft polymers possess over non-thermally stabilized multi-stage polyorganosiloxane/polyvinyl-based graft polymers.

SUMMARY OF THE INVENTION

Figure 1:
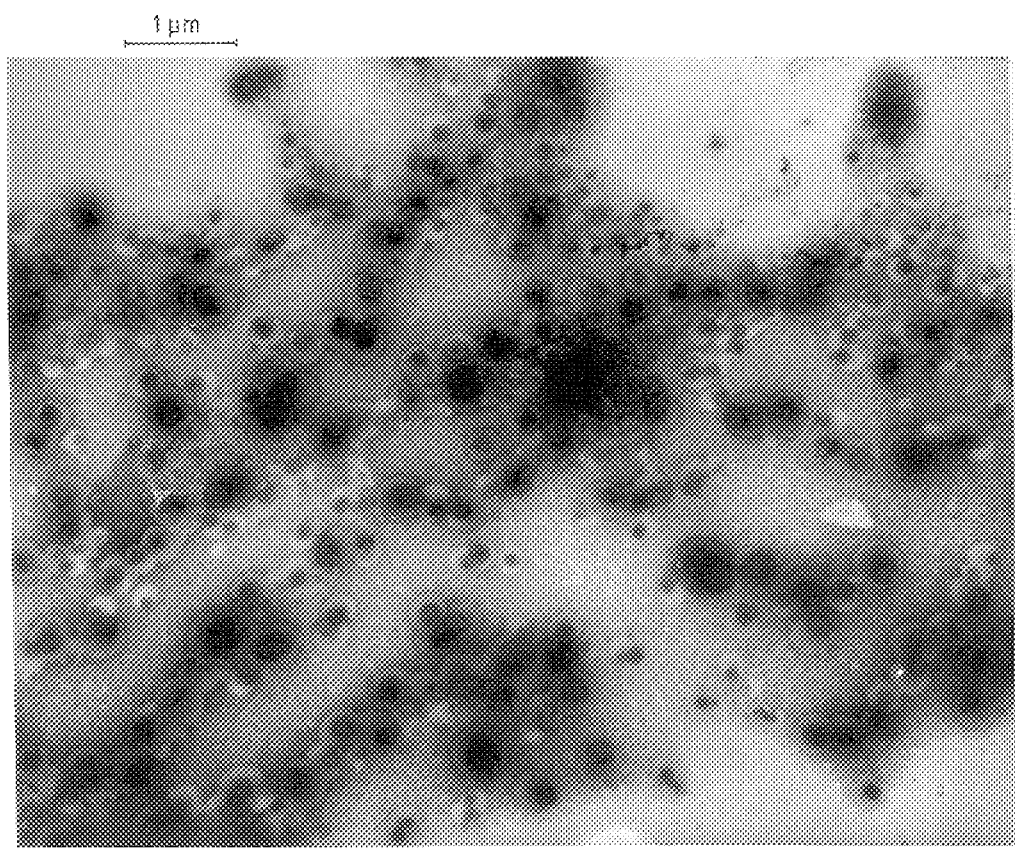
FIG. 1 is a transmission electron micrograph of a co-homopolymerized polyorganosiloxane/polyvinyl substrate prepared in accordance with the present invention.

According to the present invention, there are provided low temperature ductile and impact resistant compositions comprising: (A) a polycarbonate resin; and (B) a low temperature ductility and impact strength improving amount of a multi-stage polyorganosiloxane/polyvinyl-based graft polymer composition comprising (a) as a first stage, a polymeric co-homopolymerized substrate comprised of, in combination, an organosiloxane polymer; a vinyl-based polymer; and optionally units derived from a cross-linking agent or agents, units which serve as a graft-linking agent or agents units, units derived from a cross-linking agent or agents and units from the same or different agent or agents which serve as a graft-linking agent or agents, or a mixture of any of the foregoing units; (b) a second stage graft polymerized in the presence of the substrate comprising at least one alkyl (meth)acrylate polymer and optionally units derived from cross-linking agent or agents, units which serve as a graft-linking agent or agents, units derived from a cross-linking agent or agents and units from the same or different agent or agents which serve as a graft-linking agent or agents, or a mixture of any of the foregoing units, to form a substrate/second stage intermediate; and (c) a third stage graft polymerized in the presence of the substrate/second stage intermediate comprising at least one alkenyl aromatic polymer and preferably consisting essentially of styrene.

A method of improving low temperature ductility and impact strength of a polycarbonate resin comprising mixing the polycarbonate with the above multi-stage polyorganosiloxane/polyvinyl-based graft polymer is provided as well.

Also contemplated by the invention are thermally stabilized multi-stage polyorganosiloxane/polyvinyl-based graft copolymer compositions having improved color-imparting and impact resistance imparting properties comprising (a) as a first stage, a polymeric co-homopolymerized substrate comprised of, in combination, an organosiloxane polymer; a vinyl-based polymer; and optionally units derived from a cross-linking agent or agents, units which serve as a graft-linking agent or agents, units derived from a cross-linking agent or agents and units from the same or different agent or agents which serve as a graft-linking agent or agents, or a mixture of any of the foregoing units; and (b) at least one subsequent stage or stages graft polymerized in the process of any previous stage and which is comprised of a vinyl-based polymer or a cross-linked vinyl-based polymer, the graft copolymer being superdried.

In a preferred embodiment the thermally stabilized modifier subsequent stages comprise (b)(i) a second stage comprising at least one polymer which optionally includes units derived from a cross-linking agent or agents, units which serve as a graft-linking agent or agents, units derived from a cross-linking agent or agents and units from the same or different agent or agents which serve as a graft-linking agent or agents, or a mixture of any of the foregoing units; and (b)(ii) a third stage comprising at least one vinyl-based polymer or a cross-linked vinyl-based polymer which is the same as, or different than, the (b)(i) polymer.

The invention also provides a process for producing a thermally stabilized multi-stage polyorganosiloxane/polyvinyl-based graft polymer comprising the steps of:

(i) providing a first stage substrate by the concurrent co-homopolymerization of an organosiloxane and one or more vinyl-based monomer(s) optionally in the presence of effective amounts of units which serve as a graft-linking agent(s), units derived from a cross-linking agent(s), units derived from a cross-linking agent and units from the same or different which serve as graft-linking agent(s), or a mixture thereof;

(ii) neutralizing the reaction mass of the foregoing co-homopolymerization step to pH of at least about 6.5 to provide a neutralized polyorganosiloxane/polyvinyl-based substrate latex;

(iii) graft polymerizing at least one vinyl-based monomer in a subsequent stage in the presence of the polyorganosiloxane/polyvinyl-based substrate thereby providing a multi-stage polyorganosiloxane/polyvinyl-based graft polymer;

(iv) drying the multi-stage polyorganosiloxane/polyvinyl-based graft polymer; and (v) superdrying the dried multi-stage polyorganosiloxane/polyvinyl-based graft polymer.

Further contemplated by the invention are compositions comprising (A) a thermoplastic resin, and (B) an effective modifying amount of thermally stabilized multi-stage polyorganosiloxane/polyvinyl-based polymer composition above defined. Properties modified include at least one of impact strength, color, ductility, thermal stability, and the like.

DETAILED DESCRIPTION OF THE INVENTION

The multi-stage graft polymers of the present invention are made sequentially by a process which begins with a co-homopolymerization step.

Co-homopolymerization refers to a polymerization step where two distinct polymerization mechanisms are effected concurrently, including simultaneously. In particular, the first stage co-homopolymerization may encompass a siloxane polymerization (e.g. ring opening and condensation mechanism) in conjunction with a concurrent vinyl polymerization. The discrete mechanisms are not seen as competing with each other; rather, two homopolymers are concurrently produced each retaining its own structure. This is evidenced by the two distinct glass transition temperatures which can be detected by differential scanning calorimetry (DSC). Preferably, the product of the co-homopolymerization process is rubbery instead of a resin-like powder.

FIG. 1 illustrates the morphology of a typical co-homopolymerized substrate. The substrate latex presents itself in the micrograph as predominantly dark circular areas (1) surrounded by halos of light circular areas (3) with definite boundaries. The dark areas (1) represent stained vinyl-based rich areas and the light areas (3) are polyorganosiloxane rich. The co-homopolymerization reaction produces an area rich in vinyl-based polymer surrounded and slightly permeated by the polyorganosiloxane, but each component retains its autonomy as two discrete phases.

Additional cross-linking and/or graft-linking agent(s) can be utilized in this initial stage to provide co-homopolymers from both polymeric constituents which provides greater rubber integrity.

Subsequent to the co-homopolymerization of the siloxanes and vinyl-based monomers of the first step, at least one additional or subsequent graft polymerization process is utilized to achieve multi-stage polyorganosiloxane/polyvinyl-based graft polymers.

If a non-thermally stabilized modifier that will improve the low temperature ductility and impact strength of polycarbonates is to be prepared, the subsequent graft stage polymerization is necessarily carried out in two sequential stages providing two stages graft polymerized one after the other onto the substrate. The first grafted stage polymerized onto the substrate, i.e. the second stage, is of at least one alkyl(meth)acrylate and optional units derived from a cross-linking agent or agents, units which serve as a graft-linking agent or agents, units derived from a cross-linking agent or agents and units from the same or a different agent or agents which serve as a graft-linking agent or agents, or a mixture of any of the foregoing units. This forms a substrate/second stage intermediate onto which the second grafted stage, i.e the third stage, of at least one vinyl aromatic polymer is grafted.

The subsequent graft stage polymerization of the thermally stabilized modifier is preferably of at least one vinyl type monomer. It has been found that styrene/acrylonitrile copolymer, styrene/divinylbenzene copolymer, or an alkyl (meth)acrylate is particularly effective as the second stage graft polymer or copolymer, or as the outermost stage when intermediary stages are optionally utilized therein. The graft polymer is then thermally stabilized as described below.

The foregoing thermally stabilized polyorganosiloxane/polyvinyl-based graft polymer or non-thermally stabilized low temperature ductility and impact strength improving polyorganosiloxane/polyvinyl-based graft polymer can be isolated and utilized as an impact strength modifying agent for thermoplastic resins as will be discussed in detail below. The latter modifier is particularly preferred when mixed with polycarbonate resins.

The first stage rubbery substrate of the modifiers of the present invention is provided by a series of sequential processing steps. In a premixing step, the ingredients required for the co-homopolymerization of the organosiloxane(s) and the vinyl-based monomer(s) are premixed with water and suitable cross-linker(s), graft-linker (s), initiator(s) and surfactant(s). The premixed ingredients are homogenized by conventional means. The co-homopolymerization reactions may begin at this early stage of the process, but these reactions are generally slow at room temperature. The homogenized reactants may be directed to a reactor vessel, typically stainless steel or glass flasks, under a nitrogen blanket. Heat is applied to facilitate the reaction. For typical 5 to 50 gallon stainless steel reactions, a 3 to 6hour residence time at 75° C. to 90° C. is adequate to complete the co-homopolymerizations. Cooling for 2 to 6 hours will typically reduce the temperature to at least room temperature where the reaction mass can be held for 3 to 72 hours. Cooling to lower temperatures (e.g. 5° C.) may be sometimes preferred since this may enhance the properties of the formed polyorganosiloxane/polyvinyl substrate.

Cooling to room temperature or lower allows the polyorganosiloxane portion to build molecular weight, thereby minimizing the extractable silicone rubber fragments and optimizing physical properties of the product for certain applications. Generally, lower temperatures are preferred when it is desired to optimize the elasticity of the formed polyorganosiloxane/polyvinyl substrate. The time of cooling will also determine rubber particle size.

The initiator for the siloxane component of the co-homopolymerization can be any ionic ring opening type initiator when cyclic siloxanes are utilized, such as alkylarylsulfonic acids, alkyldiaryldisulfonic acids, alkylsulfonic acids, or the like. The best suited example is dodecylbenzenesulfonic acid which can act as an initiator and at the same time as an emulsifier. In some cases, the joint use of a metal salt of an aforementioned sulfonic acid is also preferred.

The initiator for the styrenic or other vinyl monomers in the co-homopolymerization process can be any organic soluble radical initiator, such as azobisisobutyronitrile (AIBN) and the organic peroxides, e.g. benzoyl peroxide, dichloro benzoyl peroxide, tert-butyl perbenzoate. Also suitable are water soluble radical initiators such as the persulfates. Although it is possible to charge this type of initiator at the beginning of the process, it is preferred that it be charged continuously or incrementally during the co-homopolymerization period. Since persulfate is less stable in the acid conditions of the siloxane polymerization, it is preferred that the persulfate be added over time to keep the vinyl polymerization running. Particle size, pH, and total solids measurements can be readily monitored at this stage of the process. A latex rubber emulsion prepared as described above will generally contain particles having an average diameter of 75 to 800 nanometers. The particle size is particularly influenced by the homogenization pressure (and the number of passes through the homogenizer) and the composition of the reaction ingredients. A pressure range of 2000 to 12000 psi is typical, and 3000 to 9000 psi is preferred. Multiple passes through the homogenizer may be preferred, but on a large scale a single pass may be most practical.

The foregoing reaction steps must be followed by a suitable neutralization process. The main object of the neutralization is to quench the siloxane polymerization. This is accomplished by adding a caustic solution such as sodium hydroxide, potassium hydroxide, potassium or sodium carbonate, sodium hydrogen carbonate, triethanolamine or triethylamine. The pH of the reaction solution may be raised from a level of 1 to 3 to a pH of at least about 6.5, and preferably 7 to 9.

It is often desirable to add additional soap or surfactant to the emulsion formed at the end of the first stage, prior to the neutralization step. Additional surfactant tends to facilitate avoidance of premature agglomeration or flocculation of the co-homopolymerized rubber in the quench step.

The foregoing co-homopolymerization process provides a rubbery polyorganosiloxane/polyvinyl substrate. This substrate is the first stage of the polyorganosiloxane/polyvinyl-based graft polymers of the present invention.

The next stage or stages involves the graft polymerization of additional vinyl-functional moieties onto graft sites provided by the rubbery substrate particles in the latex formed in the first stage. Subsequent additional stages are optional but may be preferred for certain applications, such as in the formulation of a low temperature ductility and low temperature impact strength modifier for thermoplastic resins, especially polycarbonate resins.

The grafted polymers will preferably be the product of a vinyl polymerization process. Suitable vinyl monomers for graft polymerization of the intermediate or second stage in the preparation of the non-thermally stabilized low temperature improvement impact modifier include alkyl (meth) acrylates and particularly methyl (meth)acrylate. Suitable monomers for graft polymerization of the outermost or third stage of the non-thermally stabilized modifier include alkenyl aromatic monomers and preferably styrene monomers.

Suitable vinyl monomers for graft polymerization in the preparation of the thermally stabilized modifier include without limitation: alkenyl aromatic compounds such as styrene, divinylbenzene, alpha-methylstyrene, vinyl toluene, halogenated styrene and the like; (meth)acrylates such as methyl (meth)acrylate and 2-ethylhexyl (meth)acrylate; acrylates such as acrylic acid, methyl acrylate, ethyl acrylate and butyl acrylate; vinyl cyanide compounds such as acrylonitrile and methacrylonitrile; olefins such as ethylene, propylene, butadiene, isoprene, and chloroprene; and other vinyl compounds such as acrylamides, N-(mono or disubstituted alkyl)acrylamides, vinyl acetate, vinyl chloride, vinyl alkyl ethers, allyl (meth)acrylate, triallyl isocyanurate, ethylene dimethacrylate, diallyl maleate, maleic anhydride; maleimide compounds such as maleimide, or N-phenyl (or alkyl)maleimide; and mixtures of these monomers.

With respect to the thermally stabilized modifier, grafted polystyrene, poly(meth)acrylate, styrene/acrylonitrile copolymer or styrene/divinylbenzene copolymer as the outermost stage are preferred, yet many other intermediary stages such as a butyl acrylate stage are also contemplated. Furthermore, the grafting of additional stages of the same or different kind is also possible in the thermally stabilized modifier.

The vinyl polymerization is accomplished in an emulsion; therefore water soluble initiators are suitable, e.g., potassium persulfate, sodium persulfate and ammonium persulfate. It is practical to add the initiator at the beginning of this step, prior to charging the vinyl monomer for the second stage polymerization. Other Redox initiator systems, such as cumene hydroperoxide/ferrous sulfate/glucose/sodium pyrophosphate, can also be utilized at this stage as well as other organic peroxides.

Sequential multi-stage polymerization processes of this type are sometimes referred to as core-shell processes. It is preferred, however, to describe them as multi-stage graft polymerization processes wherein the initial stage provides a co-homopolymerized organosiloxane/vinyl-based substrate. This substrate may have sufficient grafting sites for a second or subsequent stage to be grafted thereto.

Although the resultant multi-stage polyorganosiloxane polyvinyl-based graft polymer from the process described above may be used as is, it is typically dried by conventional methods, e.g. under vacuum or in a fluidized bed drier, for a period of time, i.e. several hours preferably 1 to 4 hours, at an art recognized temperature range, i.e. 60° C.–90° C. The resultant material would be considered a dried multi-stage polyorganosiloxane/polyvinyl-based graft polymer. Typically, using isothermal TGA to measure melt stability, the weight retained of this dried graft copolymer after 15 minutes at 300° C. ranges from about 35 percent to about 70 percent, based upon the weight of the pre-dried (as-produced) modifier. The non-thermally stabilized modifier is useful in both its as-produced or dried forms.

However, the dried material may be thermally stabilized by superdrying. Superdrying is additional drying of the dried graft copolymer for a length of time, typically from about 1 to 3 hours, preferably from about 1½ to 2½ hours and most preferably about 2 hours, at a temperature higher than the typical initial drying, preferably ranging from about 100° C. to about 150° C. and most preferably about 120° C., the temperature and period and ultimately the superdrying being sufficient to improve weight retained after 15 minutes at 300° C. as measured by isothermal TGA to measure melt stability of the superdried modifier when compared to the as-produced or dried modifier, to about 85 percent or greater and preferably to about 98 to about 99 percent based upon the weight retained by the dried modifier. Superdrying typical results in minimal weight loss of the as-produced or dried modifier, i.e. less than five percent and typically 1 to 2 percent, indicating that superdrying causes a chemical change in the modifier.

In general, the first stage comprising the co-homopolymerized polyorganosiloxane/polyvinyl-based substrate will comprise approximately 5 to 95 weight percent of the total non-thermally stabilized, the pre-superdried, or the superdried thermally stabilized graft polymer based upon the weight of the first stage substrate and the subsequent stage or stages taken together. Preferably, the first stage substrate will comprise approximately 30 to 90 weight percent on the same basis. Correspondingly, the subsequent stages, comprising the additional grafted vinyl polymer(s), will comprise approximately 95 to 5 weight percent and preferably approximately 70 to 10 weight percent on the same basis. In the three stage systems, it is preferred that the second stage comprises from about 5 to about 95 parts by weight, most preferably from about 10 to about 90 parts by weight, and particularly about 50 parts by weight, and the third stage comprises from about 95 to about 5 parts by weight, most preferably from about 90 to about 10 parts by weight and particularly about 50 parts by weight respectively based upon 100 parts by weight of second and third stage combined of the non-thermally stabilized graft polymer or the pre-superdrying step thermally stabilized graft polymer. In the multi-stage systems, preferably, the ratio of first stage substrate polymer (a) or (B)(a) to second stage polymer (b)(i) is 10:90 to 90:10 and the amount of third stage polymer (b)(ii) comprises from about 10 to about 90 parts by weight per 100 parts by weight of (a) or (B)(a), (b)(i), and (b)(ii) combined again based upon the non-thermally stabilized graft polymer or the pre-superdrying thermally stabilized graft polymer.

Typically in a non-thermally stabilized three stage multi-stage low temperature modifier, the first stage substrate will comprise from about 30 to about 70 parts and preferably about 70 parts by weight, and the second and third stages combined will comprise from about 70 to about 30 parts by weight and preferably about 30 parts by weight of first stage substrate, second stage and third stage combined.

The organosiloxanes useful in the first stage co-homopolymerization are any of those known to produce silicone elastomers and may include those which are hydroxy-, vinyl-, hydride-, or mercapto-end capped linear organosiloxane oligomers.

The polyorganosiloxanes illustratively will be comprised primarily of a mixture of units of the formula

wherein R is hydrogen or a monovalent hydrocarbon radical of about 1 to 16 carbon atoms nd n is 0, 1 or 2.

Preferred among the organosiloxanes are those in cyclic form having three or more siloxane units, and most preferred are those having three to six units. Such organosiloxanes include without limitation, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane and octaphenylcyclotetrasiloxane. These or similar organosiloxanes may be used alone or in combination.

The vinyl monomers useful in conjunction with the co-homopolymerization of organosiloxanes in the first stage are preferred to be alkenyl aromatic compounds such as styrene, divinylbenzene, alpha-methylstyrene, vinyl toluene, vinyl naphthalene, vinyl anthracene, and halogenated styrene or its derivatives. Other suitable vinyl monomers include acrylic acids and acrylates such as methyl-, ethyl-, allyl-, or butylacrylate; (meth)acrylates such as methyl (meth)acrylate or 2-ethylhexyl (meth)acrylate; vinyl cyanides such as acrylonitrile or methacrylonitrile; olefins such as ethylene, propylene, butadiene, isoprene, chloroprene, and other vinyl compounds such as vinyl imidazole, 5-vinyl-2-norbornene, vinyl pyridine, vinyl pyrrolidine, vinyl acetate, vinyl alkyl ethers, vinyl chloride, vinyl furan, N-vinyl carbazole, allyl (meth)acrylate, triallyl isocyanurate, ethylene di (meth) acrylate, butylene di(meth)acrylate, diallyl maleate, maleic anhydride; maleimide compounds such as maleimide or N-phenyl (or alkyl) maleimides; acrylamides; N-(mono or di-substituted) acrylamides; and mixtures of any of these monomers. In general, any rubbery or glassy vinyl type monomer may be used which can be mixable with the organosiloxanes. Typically, the vinyl component of the first stage co-homopolymer will be present in an amount of approximately 3 to 97 weight percent, and correspondingly, the organosiloxane component will be present in an amount of approximately 97 to 3 weight percent. Preferably, the vinyl-based component will comprise approximately 5 to 45 weight percent of the first stage of the co-homopolymerized substrate.

Graft-linking agents serve as a source of units which permit the branching effect for subsequent polymerization, and cross-linking agents serve as a source of units which link together polymer chains within their own polymerization state.

The cross-linker agent used in conjunction with the organosiloxane component or subsequent stage components of the present modifiers can be any of those known to one of ordinary skill in the art and include, but are not limited to, those of the general formula

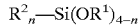

$R^2{}_n$—Si(OR$^1$)$_{4-n}$ wherein n is 0, 1 or 2, preferably 0 or 1 and each $R^1$ independently represents hydrogen or a monovalent hydrocarbon radical selected from among alkyl or aryl radicals having 1 to 16 carbon atoms, preferably methyl, ethyl and phenyl. $R^2$ can be the same as $R^1$ or can be a vinyl, alkenyl, thio, or (meth)acryloxyalkyl functional radical. When $R^2$ is a vinyl, alkenyl, thio, or acryloxyalkyl radical and n is 1, the cross-linking agent can also act as a graft-linking agent.

A preferred cross-linking agent is tetraethoxysilane. Suitable graft-linking agents include those known in the art. A combination cross-linking and graft-linking agent is vinyltriethoxysilane. Another suitable choice is gammamethacryloxypropyltrimethoxysilane.

The multi-stage polyorganosiloxane/polyvinyl-based graft product of the present invention can be isolated by conventional means such as hot solution coagulation. For example, an electrolytic solution of about 0.5 to 5 percent aluminum sulfate or magnesium sulfate in water can be prepared and heated to about 75° to 95° C. When the latex is added, with agitation, the graft product will precipitate and can be held at elevated temperature for about 10 minutes whereupon it may be filter washed. Commercial latex isolation techniques such as spray dryers may also be utilized.

In a preferred feature of the invention, the isolated non-thermally stabilized low temperature ductility and impact strength three stage graft polymer may be utilized to modify a polycarbonate resin.

In an additional preferred feature of the present invention, the thermally stabilized multi-stage modifier may be utilized as a color enhancer and/or an impact and ductility enhancer in a composition comprising a thermoplastic resin (A) and the thermally stabilized modifier (B). Illustrative of suitable thermoplastic resins are a poly(vinylic) resin, a polyester resin, a polyamide resin, a polycarbonate resin, a polyacetal resin, a polyether resin, a poly(etherester) resin, a poly(etherimide) resin, a poly(etherimide ester) resin, a poly(sulfone) resin, a poly(ethersulfone) resin, interpolymers comprising units of any of the foregoing resins, and compositions comprising blends of any of them.

The polycarbonate resins suitable herein are produced by using a dihydroxydiarylalkane as the main starting material and optionally has branched chains. Such polycarbonate resins are manufactured by known processes and generally by the reaction of a dihydroxy compound and/or a polyhydroxy compound with either phosgene or a diester of carbonic acid. Suitable dihydroxydiarylalkanes include those having at least one alkyl group, chlorine, atom, or bromine atom in any of the positions ortho to the hydroxyl groups. Preferred examples of the dihydroxydiarylalkane include 4,4'-dihydroxy-2,2-diphenylpropane(bisphenol-A); tetramethylbisphenol-A; and bis-(4-hydroxyphenyl)-p-diisopropylbenzene. The branched polycarbonate resin can be produced by the above-mentioned reaction but using, for example, 0.2 to 2 mole percent of a polyhydroxy compound in place of a part of the dihydroxy compound. Examples of the polyhydroxy compound include 1,4-bis-(4',4,2-dihydroxytriphenylmethyl)benzene; phloroglucinol; 4,6-dimethyl-2,4,6-tris-(4-hydroxyphenyl)heptene-2; 4,6-dimethyl-2,4,6-tris-(4-hydroxyphenyl)-heptane,1,3,5-tris-(4-hydroxyphenyl)benzene; 1,1,1-tris-(4-hydroxyphenyl)ethane; and 2,2,-bis-(4,4-(4,4'-dihydroxyphenyl)-cyclohexyl)propane. Particularly preferred polycarbonate resins are of the bisphenol-A type.

Examples of suitable poly(vinylic) resins include, but are not limited to, styrene polymers and copolymers as well as substituted styrene polymers and copolymers, e.g., those from vinyl toluene and alpha-methylstyrene and any copolymerizable vinyl monomer, such as acrylonitrile, methyl (meth)acrylate, maleimide, or maleic anhydride, as well as grafts of styrene and related compounds and backbone polymers such as butadiene, i.e., the styrene polymers known as high impact polystyrene, also known as HIPS.

The polyester resins can be saturated or unsaturated. Suitable polyesters resins can be derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeated units of the following general formula:

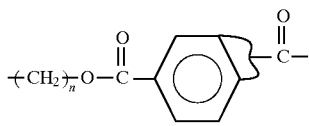

wherein n is an integer of from 2 to 4. The most preferred polyesters are poly(ethylene terephthalate) and poly(1,4-butylene terephthalate).

Also contemplated herein are the above polyesters with minor amounts, e.g., from 0.5 to about 2 percent by weight, of units derived from aliphatic acid and/or aliphatic polyols, to form copolyesters. The aliphatic polyols include glycols, such as poly(ethylene glycol) or poly(butylene glycol). All such polyesters can be made following the teachings of, for example, U.S. Pat. Nos. 2,465,319 and 3,047,539.

The polyesters which are derived from a cycloaliphatic diol and an aromatic dicarboxylic acid are prepared, for example, by condensing either the cis- or trans-isomer (or mixtures thereof) of, for example, 1,4-cyclohexanedimethanol with an aromatic dicarboxylic acid so as to produce a polyester having recurring units of the following formulas:

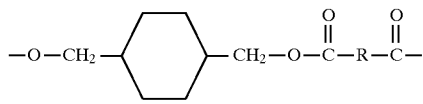

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di-(p-carboxyphenyl) ethane, 4,4'-dicarboxyldiphenyl ether, etc., and mixtures of these. All of these acids contain at least one aromatic nucleus. Acids containing fused rings can also be present, such as in 1,4- or 1,5-naphthalenedicarboxylic acids. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

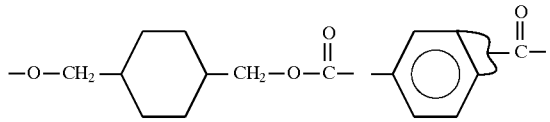

Still another preferred polyester is a copolyester derived from a cyclohexanedimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having units of the following formula:

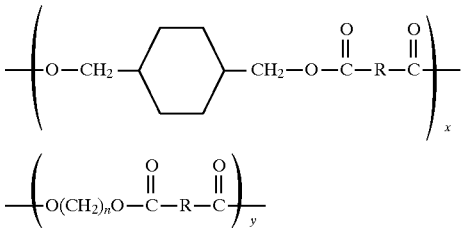

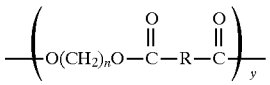

wherein the cyclohexane ring is selected from the cis- and trans-isomers thereof, R is as previously defined, n is an integer of 2 to 4, the x units comprise from about 10 to about 90 percent by weight and the y units comprise from about 90 to about 10 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

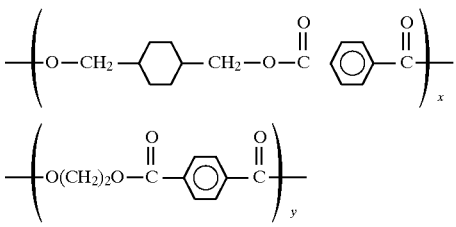

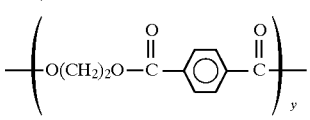

wherein x and y are as previously defined.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g as measured in a 60:40 phenol:tetrachloroethane mixture of similar solvent at 23° C.–30° C.

Examples of suitable nylons are linear polycondensates of lactams of 6 to 12 carbon atoms and conventional polycondensates of diamines and dicarboxylic acids, e.g. nylon 6,6; nylon 6,8; nylon 6,9; nylon 6,10; nylon 6,12; nylon 8,8 and nylon 12,12. Further examples to be mentioned are nylon 6, nylon 11 and nylon 12, which are manufactured from the corresponding lactams. In addition, it is possible to use polycondensates of aromatic dicarboxylic acids, e.g., isophthalic acid or terephthalic acid, with diamines, e.g., hexamethylenediamine, or octamethylenediamine, polycarbonates of aliphatic starting materials, e.g., m- and p-xylylenediamines, with adipic acid, suberic acid and sebacic acid, and polycondensates based on alicyclic starting materials, e.g. cyclohexanedicarboxylic acid, cyclohexanediacetic acid, 4,4'-diaminodicyclohexylmethane and 4,4'-diaminodicyclohexylpropane. The nylons preferably have a relative viscosity of from 2.30 to 3.60 measured at 1 percent strength in concentrated sulfuric acid at 24° C.

Examples of polyacetals which may be employed herein are, in particular, the oxymethylene polymers, polyoxymethylene being of particular importance. However, oxymethylene copolymers which, in addition to oxymethylene groups, contain up to 30 percent by weight, preferably from 0.1 to 25 percent by weight, of other oxyalkylene groups, for example the oxyethylene group, the trimethylene oxide group, are also suitable, as are terpolymers. The use of oxymethylene homopolymers in which the end groups of the molecules have been stabilized against degradation by esterifying, etherifying or some other conventional chain termination is preferred. The oxymethylene polymers usually have a melting point of about 130° C.

Polyethers which can be used herein are, in the main, polyarylene ethers amongst which polyphenylene ethers and poly(ether esters) deserve particular mention.

Polyphenylene ether resins useful in the invention are homopolymers or copolymers represented by the formula

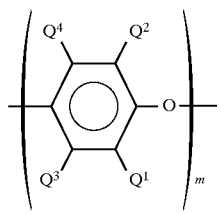

wherein $Q^1$ through $Q^4$ are selected independently of each other from the group consisting of hydrogen and hydrocarbon radicals and m denotes a number of 30 or more.

Examples of such polyphenylene ether resins include poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, copolymer of (2,6-dimethyl-1,4-phenylene)ether with (2,3,6-trimethyl-1,4-phenylene)ether, copolymer of (2,6-diethyl-1,4-phenylene)ether with (2,3,6-trimethyl-1,4-phenylene)ether, and copolymer of (2,6-dimethyl-1,4-phenylene)ether with (2,3,6-triethyl-1,4-phenylene)ether. Of these polymers, preferred are poly(2,6-dimethyl-1,4-phenylene)ether and a copolymer of (2,6-dimethyl-1,4-phenylene)ether with (2,3,6-trimethyl-1,4-phenylene)ether. Particularly preferred is a poly(2,6-dimethyl-1,4-phenylene)ether resin; however, in order to lower its melt viscosity and to improve its processability, it may be advantageous to admix it with from about 10 to about 90 percent by weight of polystyrene based upon the mixture of polyphenylene ether and styrene.

Although there is no particular restriction on the polymerization degree of the polyphenylene ether resin used in the invention, it is preferable to use the resin having a reduced viscosity of 0.3 to 0.7 dl/g measured in chloroform at 25° C. Resins having a less reduced viscosity than 0.3 dl/g tend to exhibit low heat stability while resins having a reduced viscosity exceeding 0.7 dl/g tend to have inferior moldability.

If polyphenylene ethers are to be blended, e.g., with polyamides, polycarbonates, polyesters, mixtures thereof and the like, a small amount of functionalizing agent, e.g., maleic anhydride, fumaric acid, etc., can be reacted with the polyphenylene ether in known ways to improve compatibility.

The poly(ether ester) resins for use in the invention are random or block copolymers comprising polyester segments and polyether segments having molecular weight of 400 to 20,000. In general, these are prepared by conventional esterification/polycondensation processes from (i) one or more diols, (ii) one or more dicarboxylic acids, (iii) one or more long chain ether glycols, and optionally, (iv) one or more lactones or polylactones.

Diols which can be used in the preparation of the poly(ether ester) resins include both saturated and unsaturated aliphatic and cycloaliphatic dihydroxy compounds. These diols are preferably of low molecular weight, i.e. having molecular weight of about 250 or less.

The term "diols" and "low molecular weight diols" with respect to the poly(ether esters) include equivalent ester forming derivatives thereof, provided however, that the molecular weight requirement pertains to the diol only and not to its derivatives. Ester forming derivatives include the acetates of the diols as well as, for example, ethylene oxide or ethylene carbonate for ethylene glycol.

Preferred saturated and unsaturated aliphatic and cycloaliphatic diols useful in the production of the poly (ether ester) resins are generally those having from about 2 to about 20 carbon atoms, including ethylene glycol; propanediol; butanediol; pentanediol; 2-methyl propanediol; 2,2-dimethyl propanediol; hexanediol; decanediol; 1,2-, 1,3- and 1,4-dihydroxy cyclohexane; 1,2-, 1,3-, and 1,4-cyclohexane dimethanol; butenediol; hexenediol, and the like. Especially preferred are 1,4-butane diol and mixtures thereof with hexanediol or butenediol.

Aromatic diols suitable for use in the preparation of the poly(ether ester) resins are generally those having from 6 to about 19 carbon atoms. Included among the aromatic dihydroxy compounds are resorcinol, hydroquinone; 1,5-dihydroxy naphthalene, 4,4'-dihydroxy diphenyl, bis(p-hydroxy phenyl)methane and 2,2-bis(p-hydroxy phenyl) propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole percent and most preferably at least 80 mole percent, based on the total diol content, is the same diol. As mentioned above, the preferred poly(ether ester) resins are those in which 1,4-butane diol is present in a predominant amount.

Dicarboxylic acids which are suitable for use in the preparation of the poly(ether ester) resins include aliphatic, cycloaliphatic, and/or aromatic dicarboxylic acids. These acids are preferably of a low molecular weight, i.e., having a molecular weight of less than about 350; however, higher molecular weight dicarboxylic acids, especially dimer acids, may also be used. The term "dicarboxylic acids" with respect to the poly(ether ester) resins includes equivalents of dicarboxylic acids having two functional carboxyl groups which perform substantially like dicarboxylic acids in reaction with glycols and diols in forming polyester polymers. These equivalents include esters and ester-forming derivatives, such as acid halides and anhydrides. Additionally, the dicarboxylic acids may contain any substituent group(s) or combinations which do not substantially interfere with the polymer formation and the use of the polymer in the practice of this invention.

Aliphatic dicarboxylic acids, with respect to the poly (ether ester) resins, include carboxylic acids having two carboxyl groups each of which is attached to a saturated carbon atom. If the carbon atom to which the carboxyl group is attached is saturated and is in a saturated ring, the acid is cycloaliphatic.

Aromatic dicarboxylic acids useful in the preparation of poly(ether ester) resins are dicarboxylic acids having two carboxyl groups each of which is attached to a carbon atom in an isolated or fused benzene ring system. It is not necessary that both functional carboxyl groups be attached to the same aromatic ring, and where more than one ring is present, they can be joined by aliphatic or aromatic divalent radicals or divalent radicals such as —O— or —SO$_2$—.

Representative aliphatic and cycloaliphatic acids which can be used in the preparation of the poly(ether ester) resins are preferably $C_4$–$C_{44}$ dicarboxylic acids such as, but not limited to, sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, dimer acid, 2-ethylsuberic acid, tetramethylsuccinic acid, cyclopentane dicarboxylic acid, decahydro-1,5-naphthalene dicarboxylic acid, 4,4'-bicyclohexyl dicarboxylic acid, decahydro-2,6-naphthalene dicarboxylic acid, 4,4-methylene-bis-(cyclohexane carboxylic acid), 3,4-furandicarboxylic acid, and 1,1-cyclobutanedicarboxylic acid. Preferred aliphatic acids are cyclohexanedicarboxylic acid, sebacic acid, dimer acid, glutaric acid, azelaic acid and adipic acid.

Representative aromatic dicarboxylic acids which can be used in this preparation include terephthalic, phthalic and isophthalic acids, bi-benzoic acid, substituted dicarboxy compounds with two benzene nuclei such as bis(p-carboxyphenyl) methane, oxybis(benzoic acid) ethylene, 1,2-bis-(p-oxybenzoic acid), 1,5-naphthalenedicarboxylic acid, 2,6-napthalenedicarboxylic acid, 2,7-naphthalenedicarboxylic acid, phenanthrenedicarboxylic acid, anthracenedicarboxylic acid, 4,4'-sulfonyldibenzoic acid, and halo and $C_1$–$C_{12}$ alkyl, alkoxy, and aryl ring substitution derivatives thereof. Hydroxy acids such as p-(beta-hydroxy-ethoxy)benzoic acid can also can be used provided an aromatic dicarboxylic acid is also present.

Preferred dicarboxylic acids for the preparation of the poly(ether ester) resins are the aromatic dicarboxylic acids, mixtures thereof and mixtures of one or more dicarboxylic acids with an aliphatic and/or cycloaliphatic dicarboxylic acid, most preferably the aromatic dicarboxylic acids. Among the aromatic acids, those with 8–16 carbon atoms are preferred, particularly the benzene dicarboxylic acids, i.e., phthalic, terephthalic and isophthalic acids and their dimethyl derivatives. Especially preferred is dimethyl terephthalate.

Where mixtures of dicarboxylic acids are employed, it is preferred that at least 60 mole percent, and preferably at least about 80 mole percent, based on 100 mole percent of dicarboxylic acid are of the same dicarboxylic acid or ester derivative thereof. As mentioned above, the preferred poly (ether esters) are those in which dimethyl terephthalate is the predominant dicarboxylic acid.

Suitable long chain ether glycols which can be used in the preparation of the thermoplastic poly(ether ester) resins are preferably poly(oxyalkylene)glycols and copoly (oxyalkylene)glycols of molecular weight of from about 400 to 12000. Preferred poly(oxyalkylene) units are derived from long chain ether glycols of from about 900 to about 4000 molecular weight and have a carbon-to-oxygen ratio of from about 1.8 to about 4.3, exclusive of any side chains.

Representative of suitable poly(oxyalkylene)glycols are poly(ethylene ether)glycol; poly(propylene ether)glycol; poly(tetramethylene ether)glycol; random or block copolymers of ethylene oxide and propylene oxide, including ethylene oxide end-capped poly(propylene ether)glycol and predominantly poly(ethylene ether) backbone, copoly (propylene ether-ethylene ether)glycol; and random or block copolymers of tetrahydrofuran with minor amounts of a second monomer such as ethylene oxide, propylene oxide or methyltetrahydrofuran used in proportions such that the carbon-to-oxygen ratio does not exceed about 4.3. Polyformal glycols prepared by reacting formaldehyde with diols such as 1,4-butanediol and 1,5-pentanediol are also useful. Especially preferred poly(oxyalkylene) glycols are poly (propylene ether)glycol, poly(tetramethylene ether) glycol and predominantly poly(ethylene ether) backbone, copoly (propylene ether-ethylene ether)glycol.

Optionally, these poly(ether esters) may have incorporated therein one or more lactones or polylactones. Such lactone modified poly(ether esters) are disclosed in U.S. Pat. No. 4,569,973.

Lactones suitable herein are widely available commercially, e.g., Union Carbide Corporation and Aldrich Chemicals. While epsilon caprolactone is especially preferred, it is also possible to use substituted lactones wherein the lactone is substituted by a lower alkyl group such as a methyl or ethyl group at the alpha, beta, gamma, delta, or epsilon positions. Additionally, it is possible to use polylactone, including homopolymers and copolymers thereof with one or more components, as well as hydroxy terminated polylactone, as block units in these poly(ether esters). Suitable polylactones and processes for their production are described in for example, U.S. Pat. Nos. 3,761,511; 3,767,627; and 3,806,495.

These poly(ether ester) resins are more fully described in European Patent Application No. 0,372,296, (copending application, U.S. Ser. No. 07/279,353, filed Dec. 7, 1988) now U.S. Pat. No. 5,112,915.

In general, suitable poly(ether ester) resins are those in which the weight percent of long chain ether glycol component or the combined weight percent of long chain ether glycol component and lactone component in the poly(ether ester) is from about 5 to about 80 weight percent. Preferably, the weight percent of long chain glycol or long chain glycol and lactone is from about 10 to 50 weight percent.

As described above, the poly(ether ester) resins may be prepared by conventional esterification/condensation reactions for the production of polyesters. Exemplary of the processes that may be practiced are as set forth in for example, U.S. Pat. Nos. 3,023,192; 3,763,109; 3,651,014; 3,663,653; and 3,801,547. Additionally, these modifiers may be prepared by known processes to effect random copolymers, block copolymers or hybrids thereof wherein both random and block units are present. For example, it is possible that any of two or more of the foregoing monomers/ reactants may be prereacted prior to polymerization of the final poly(ether esters). Alternatively, a two part synthesis may be employed wherein two different diols and/or dicarboxylic acids are each prereacted in separate reactors to form two low molecular weight prepolymers which are then combined with the long chain ether glycol to form the final triblock poly(ether ester).

Preferred examples of the polyester segment are poly(1, 4-butylene terephthalate) and poly(ethylene terephthalate). Preferred polyether segments include a polyalkylene ether glycol, e.g., polyethyleneoxide glycol, polytetramethyleneoxide glycol, polypropyleneoxide glycol, or a mixture thereof; an aliphatic polyester; or polyalphacaprolactone.

Poly(etherimides) are amorphous thermoplastics based upon repeating aromatic imide and ether units having the general formula

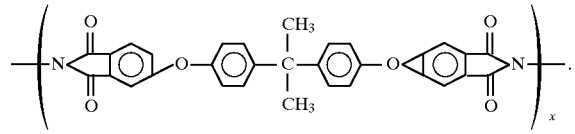

Particularly notable are the poly(etherimide esters) which comprise the reaction product of (i) one or more diols; (ii) one or more dicarboxylic acids; and (iii)(1)(I) one or more polyoxyalkylene diimide diacids; and optionally (II) one or more tricarboxylic acids or derivatives thereof; (2) a combination of (I) one or more polyoxyalkylene diimide diacids; (II) one or more dimer acids wherein the amount of dimer is from about 5 to about 40 parts by weight based upon 100 parts by weight of (I) and (II); and optionally, (III) one or more tricarboxylic acids or derivatives thereof; or (3) a combination of (I) one or more high molecular weight poly(oxyalkylene) diamines; and (II) one or more tricarboxylic acids or derivatives thereof.

Preferred poly(etherimide ester) resins may be prepared from (i) one or more diols, preferably low molecular weight diols, and preferably, one or more $C_2$–$C_{15}$ aliphatic and/or cycloaliphatic diols, (ii) one or more dicarboxylic acids, preferably, one or more $C_4$–$C_{16}$ aliphatic, cycloaliphatic and/or aromatic dicarboxylic acids or ester derivatives thereof, (iii)(1) one or more polyoxyalkylene diimide diacids; (iii)(2) a combination of (I) one or more polyoxyalkylene diimide diacids, (II) one or more dimer acids wherein the amount of dimer is from about 5 to about 40 parts by weight based upon 100 parts by weight of (I) and (II), and optionally (III) one or more tricarboxylic acids or derivatives thereof; or (iii)(3) a combination of (I) one or more high molecular weight poly(oxyalkylene) diamines, and (II) one or more tricarboxylic acids or derivatives thereof. The amount of polyoxyalkylene diimide diacid employed is generally dependent upon the desired properties of the resultant poly(etherimide ester). In general, the weight ratio of polyoxyalkylene diimide diacid component (iii)(1), (2), and/or (3) to dicarboxylic acid (b) is from about 0.25 to about 2.0, and preferably from about 0.4 to about 1.4. These resins may contain additional stabilizers for even greater stabilization and low temperature impact strength of the resin itself.

Suitable diols (i) for use in preparing poly(etherimide esters) include those described above in the preparation of the poly(ether esters) above.

Dicarboxylic acids (ii) which are suitable for use in the preparation of the poly(etherimide esters) herein are as described above in the preparation of poly(ether esters). The molecular weight preference pertains to the acid and not to its equivalent ester or ester-forming derivative. Thus, an ester of a dicarboxylic acid having a molecular weight greater than 350 is included provided the acid has a molecular weight below about 350.

Polyoxyalkylene diimide diacids (iii) suitable for use in the preparation of poly(etherimide ester) resins are high molecular weight diimide diacids wherein the number average molecular weight is greater than about 700 and most preferably greater than about 900. They may be prepared by the imidization reaction of one or more tricarboxylic acid compounds containing two vicinal carboxyl groups or an anhydride group and an additional carboxyl group which must be esterifiable and preferably is nonimidizable with a high molecular weight polyoxyalkylene diamine. These polyoxyalkylene diimide diacids and processes for their preparation are more fully disclosed in European Patent Application No. 0,180,149 (U.S. Ser. No. 07/665,192, filed Oct. 26, 1984) now U.S. Pat. No. 5,317,525.

For example, they may be derived from trimellitic anhydride and a polyalkylene diamine having the formula

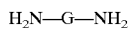

wherein G is the trivalent radical remaining after removal of the amino groups of a large chain alkylene ether diamine having a molecular weight of from about 600 to 1200.

In general, the polyoxyalkylene diimide diacids may be characterized by the following formula:

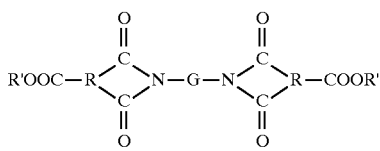

wherein each R is independently a trivalent organic radical, preferably a $C_2$ to $C_{20}$ aliphatic, aromatic or cycloaliphatic trivalent organic radical; each R' is independently selected from the group consisting of hydrogen, $C_1$ to $C_6$ aliphatic and cycloaliphatic monovalent organic radicals and $C_6$ to $C_{12}$ aromatic monovalent organic radicals, e.g. benzyl, most preferably hydrogen; and G is the divalent radical remaining after the removal of the terminal (or as nearly terminal as possible) hydroxy groups of a long chain ether glycol or the divalent radical remaining after the removal of the terminal (or as nearly terminal as possible) amino groups of a long chain alkylene ether diamine, either of which have an average molecular weight of from about 600 to about 12000, preferably from about 900 to about 4000, and a carbon-to-oxygen ratio of from about 1.8 to about 4.3.

Representative long chain ether glycols from which the polyoxyalkylene diamines are prepared include poly (ethylene ether)glycol; poly(propylene ether)glycol; poly (tetramethylene ether)glycol; random or block copolymers of ethylene oxide and propylene oxide, including propylene oxide terminated poly(ethylene ether)glycol; and random or block copolymers of tetrahydrofuran with minor amounts of a second monomer such as methyl tetrahydrofuran (used in proportion such that the carbon-to-oxygen mole ratio in the glycol does not exceed about 4.3). Especially preferred poly(alkylene ether)glycols are poly(propylene ether) glycol and poly(ethylene ether)glycols end-capped with poly (propylene ether)glycol and/or propylene oxide.

In general, the useful polyoxyalkylene diamines will have an average molecular weight of from about 600 to 12000, preferably from about 900 to about 4000.

The tricarboxylic acids useful herein may be almost any carboxylic acid anhydride containing an additional carboxylic acid or the corresponding acid thereof containing two imide-forming vicinal carboxyl groups in lieu of the anhydride group. Mixtures thereof are also suitable. The additional carboxylic group must be esterifiable and preferably is substantially nonimidizable.

Further, while trimellitic anhydride is preferred as the tricarboxylic component, any of a number of suitable tricarboxylic acid constituents will occur to those skilled in the art including 2,6,7-naphthalenetricarboxylic anhydride; 3,3', 4-diphenyltricarboxylic anhydride; 3',4-benzophenonetricarboxylic anhydride; 1,3,4-cyclopentanetricarboxylic anhydride; 2,2',3-diphenyltricarboxylic anhydride; diphenyl sulfone-3,3'4-tricarboxylic anhydride; ethylenetricarboxylic anhydride; 1,2,5-naphthalenetricarboxylic anhydride; 1,2,4-butanetricarboxylic anhydride; diphenyl isopropylidene-3, 3'4-tricarboxylic anhydride; 3,4-dicarboxyphenyl-3-carboxylphenyl ether anhydride; 1,3,4-cyclohexanetricarboxylic anhydride; and the like. These tricarboxylic acid materials can be characterized by the following formula:

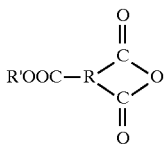

where R is a trivalent organic radical, preferably $C_2$ to $C_{20}$ aliphatic, aromatic, or cycloaliphatic trivalent organic radical and R' is preferably hydrogen or a monovalent organic radical preferably selected from the group consisting of $C_1$ to $C_{12}$ aromatic radicals, e.g. benzyl; and most preferably hydrogen.

Briefly, these polyoxyalkylene diimide diacids may be prepared by known imidization reactions including melt synthesis or by synthesizing in a solvent system. Such reactions will generally occur at temperatures of from 100° C. to 300° C., preferably at from about 150° C. to about 250° C., while drawing off water or in a solvent system at reflux temperature of the solvent or azeotropic (solvent) mixture.

Dimer acids (iii)(2)(II) useful herein are themselves prepared by the dimerization of unsaturated fatty acids of 18 carbons. Exemplary of fatty acids from which they may be prepared include but are not limited to oleic acid, linoleic acid and linolenic acid. The preparation and structure of dimer acid is described in Journal of the American Oil Chemists Society, 39, 534–545 (1962), Journal of the American Chemical Society, 66, 84 (1944) and U.S. Pat. No. 2,347,562. Suitable dimer acids may be employed in their unhydrogenated or hydrogenated form and include the acid derivatives thereof.

Several grades of dimer acid which vary in monomer and trimer content are available commercially. Inclusive of suitable commercial dimer acids are those available from Emery Industries under the tradenames EMPOL 1010 (a hydrogenated dimer acid) and EMPOL 1014. EMPOL 1010 is reported as typically containing 97 percent dimer acid, 3 percent trimer acid and essentially no monobasic acid and extremely low unsaturation, whereas EMPOL 1014 is typified as containing 95 percent, 4 percent and 1 percent of dimer, trimer and monobasic acids respectively. Also available are the dimer acids sold under the tradename HYSTRENE from the Humko Products Division of Witco Chemical Corporation, especially HYSTRENE 3695, which typically contain 95 percent dimer acid and a weight ratio of dimer to trimer of 36:1. Preferred grades are substantially free of such monomer and trimer fractions, most preferably less than 5 percent by weight, and are fully saturated or substantially so.

Where desirable, the dimer acid member may be substantially freed of monomer and trimer fractions by molecular distillation or other suitable means. In general, the dimer acid exists in the poly(etherimide ester) as a soft or rubber segment, and accordingly, dimer acids of relatively high molecular weight (preferably greater than about 500) are preferred so that the poly(etherimide ester) resins are resilient but do not deform until relatively high temperatures are reached.

The weight ratio of the above ingredients is not critical.

Preferably, the poly(etherimide esters) comprise the reaction product of dimethylterephthalate, optionally with up to 40 mole percent of another dicarboxylic acid; 1,4-butane diol, optionally with up to 40 mole percent of another saturated or unsaturated aliphatic and/or cycloaliphatic diol; and a polyoxyalkylene diimide diacid prepared from a polyoxyalkylene diamine of molecular weight of from about 600 to about 12000, preferably from about 900 to about 4000, and trimellitic anhydride. Most preferably, the diol will be 100 mole percent 1,4-butane diol and the dicarboxylic acid, 100 mole percent dimethylterephthalate.

When a dimer acid is used in combination with the polyoxyalkylene diimide diacid, preferably, the poly (etherimide ester) will comprise the reaction product of dimethylterephthalate, optionally with up to 40 mole percent of another dicarboxylic acid; 1,4-butane diol, optionally with up to 40 mole percent of another saturated or unsaturated aliphatic and/or cycloaliphatic diol; and a combination of (I) a polyoxyalkylene diamine diimide diacid prepared from a polyoxyalkylene diamine of molecular weight of from about 600 to about 12000, preferably from about 900 to 4000 and (II) dimer acid in an amount of from about 10 to about 40 percent by weight, most preferably from about 15 to about 30 percent by weight based on the combined weight of (I) and (II), and optionally trimellitic anhydride. Most preferably, the diol will be 100 mole percent 1,4-butane diol, and the dicarboxylic acid will be 100 mole percent dimethylterephthalate.

These poly(etherimide esters) described herein may be prepared by conventional esterification/condensation reactions for the production of polyesters. Exemplary of the processes that may be practiced are as set forth in, for example, U.S. Pat. Nos. 3,023,192; 3,763,109; 3,651,014; 3,663,653; and 3,801,547. Additionally, these compositions may be prepared by such processes and other known processes to effect random copolymers, block copolymers or hybrids thereof wherein both random and block units are present.

It is customary and preferred to utilize a catalyst in the process for the production of the poly(etherimide ester) resins of the present invention. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of known catalyst inhibitors or quenchers, in particular, phosphorus compounds such as phosphoric acid, phosphenic acid, phosphonic acid and the alkyl or aryl esters or salts thereof, in order to increase the thermal stability of the resultant polymer.

Suitable catalysts include, but are not limited to, the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include zinc acetate, calcium acetate and combinations thereof with antimony tri-oxide and the like. These catalysts as well as additional useful catalysts are described in U.S. Pat. Nos. 2,465,319; 2,534,028; 2,850,483; 2,892, 815; 2,937,160; 2,998,412; 3,047,539; 3,110,693 and 3,385, 830.

Where the reactants and reactions allow, it is preferred to use the titanium catalysts including the inorganic and organic titanium containing catalysts, such as those described in, for example U.S. Pat. Nos. 2,720,502; 2,727, 881; 2,729,619; 2,822,348; 2,906,737; 3,047,515; 3,056, 817; 3,056,818; and 3,075,952. Especially preferred are the organic titanates such as tetra-butyl titanate, tetra-isopropyl titanate and tetra-octyl titanate, and the complex titanates derived from the alkali or alkaline earth metal alkoxides and titanate esters, most preferably the organic titanates. These too may be used alone or in combination with other catalysts such as for example, zinc acetate, manganese acetate or antimony trioxide, and/or with a catalyst quencher as described above.

These poly(etherimide esters) are further described in U.S. Pat. Nos. 4,544,734; 4556,688; and 4,556,705.

Polysulfones are those polymers having a sulfone functionality within the repeating units of the polymer having repeating units of the formula

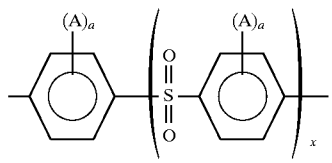

wherein A is a group which is independent and will not interfere with the polymerization reaction such as hydrogen, halogen, $C_1$–$C_5$ alkyl, $C_6$–$C_{10}$ aryl, $C_1$–$C_5$ alkoxy and $C_6$–$C_{10}$ aryloxy and wherein $a$ is an integer from 1–4 and x is an integer from 1–5.

These polysulfones may be of any length but preferably have a reduced viscosity of from 0.3 to 2 dl/g as measured in methylene chloride at 25° C.

They include poly(ether sulfones) having repeating units of the formula:

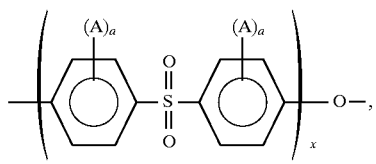

the polycarbonate sulfones having repeating units of the formula:

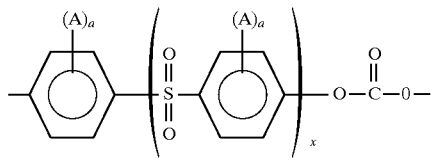

wherein A, $a$ and x are as defined above, and poly(aryl ether sulfones) having repeating units of the formula:

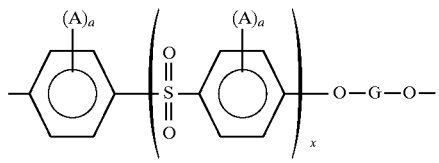

wherein G is selected from the group consisting of

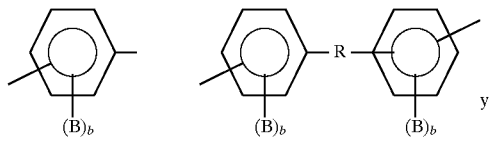

and

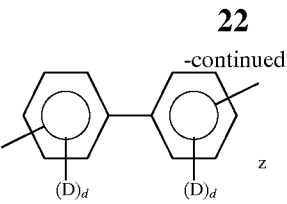

with R being selected from the group consisting of $C_1$–$C_{10}$ aliphatic, O, S, $SO_2$, CO, and $C_2Cl_2$. A, B and D are groups which are independent and will not interfere with the polymerization reaction such as hydrogen, halogen, $C_1$–$C_5$ alkyl, $C_6$–$C_{10}$ aryl, $C_1$–$C_5$ alkoxy and $C_6$–$C_{10}$ aryloxy; $a$, $b$ and $d$ are integers from 1 to 4, and x, y and z are integers from 1 to 5. Although the suitable poly(ether sulfones) and polycarbonate sulfones are not limited to a particular length, preferred polymers have a reduced viscosity of from 0.3 to 2 dl/g as measured in methylene chloride at 25° C. The polyether sulfones may be obtained by homopolymerizing halo-hydroxy-sulfones or by reacting dihydroxydiphenyl sulfone with dihalodiphenyl sulfone under the conditions mentioned below.

A dihydroxy sulfone is reacted with a carbonyl halide (phosgene) by an interfacial polycondensation process to produce the polycarbonate sulfones. This can be accomplished by known polymerization methods, such as those described in the following U.S. Pat. Nos.: 3,030,335; 3,269,986; 4,001,184; 4,224,434; 4,262,111; 4,267,305; 4,277,597; 4,277,599; 4,291,150; 4,471,105; and 4,533,722.

The poly(aryl ether sulfone) polymer may have an ordered structure, i.e. wherein G is of the same species throughout the polymer. Alternatively, the poly(aryl ether sulfone) polymer may have a random structure wherein G of the above formula varies throughout the polymer. These poly(aryl ether sulfones) may be prepared from difunctional sulfones of the formula:

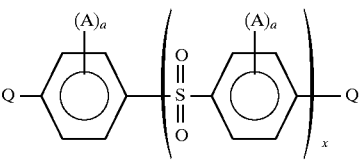

with dihydroxy compounds each having the formula HO—G—OH, wherein G, A, $a$ and x are as defined above and each Q is independently selected from the group consisting of Cl, Br, F, and $NO_2$. Examples of these monomers include but are not limited to those described in U.S. Pat. Nos. 3,658,938 and 4,503,168 and include 2,2-bis(4-hydroxyphenyl)propane, bis(4-hydroxyphenyl)methane, 4,4'-dihydroxydiphenyl sulfide, 4,4'-dihydroxydiphenyl ether, 4,4'-dihydroxydiphenyl sulfone, 4,4'-dihydroxybenzophenone, 2,4'-dihydroxydiphenyl sulfone, 4,4'-dichlorodiphenyl sulfone, 4,4'-dinitrodiphenyl sulfone, 4-chloro-4'-hydroxydiphenyl sulfone, 4,4'-biphenol hydroquinone, and the like. Poly(aryl ether sulfones) are preferably prepared from a condensation of dihalo diphenyl sulfone with the sodium salt of a dihydroxy compound, such as bisphenol-A, as described in Modern Plastics Encyclopedia, 1969–1970, McGraw Hill, N.Y. p. 198. Such a poly(aryl ether sulfone) is commercially available under the tradename Udel® polysulfone from Union Carbide and is produced from 4,4'-dichlorodiphenyl sulfone and 2,2-bis (4-hydroxyphenyl)propane.

The poly(aryl ether sulfone) polymers useful herein can also be prepared from equimolar amounts, or slight deviations therefrom, of the dihydroxy compounds and the difunctional sulfone compounds with from about 0.5 to about 1.0 mole of the alkali metal carbonate per mole of hydroxyl group, which provides the salt form of the dihydroxy compound in-situ. The hydroxy containing compound is converted to the alkali metal salt thereof by reaction with the alkali metal carbonate, which is preferably potassium carbonate. Sodium carbonate may also be used in mixtures with potassium carbonate. Other alkali metal carbonates and alkaline earth metal carbonates are also suitable. Alkali or alkaline metal bicarbonates may also be utilized alone or in conjunction with the carbonates.

The reaction mixture is preferably maintained at a temperature of about 120° to about 180° C. for about 1 to 5 hours initially and is then raised to about 200° to about 250° C. for about 1 to 10 hours. The reaction is carried out in an inert atmosphere such as nitrogen or argon at atmospheric pressure. Pressures both above and below one atmosphere may be used as desired, however. The sulfone polymer is then recovered by conventional techniques on removal of solvent and precipitation of the polymer.

The reaction takes place in a solvent mixture having a solvent which forms an azeotrope with water in order to maintain the reaction medium at substantially anhydrous conditions during polymerization. The reaction medium is maintained substantially anhydrous to secure high molecular weight polymers. It is desirable to maintain the water concentration below about 1% and most preferably below 0.5% by weight. The presence of water leads to the formation of additional phenolic species and low molecular weight products. Suitable solvents for the reaction mixture which form an azeotrope with water include aromatic hydrocarbons such as toluene, benzene, xylene, ethylbenzene, chlorobenzene and the like. Polar aprotic solvents which for the other part of the solvent medium include the sulfur containing solvents described in U.S. Pat. No. 4,503,168 of the formula:

$$R^5-S(O)_b-R^5$$

$b$ is 1 or 2 and each $R^5$ is either a $C_1-C_8$ alkyl radical or connected together to form a divalent radical or $C_6-C_{12}$ aryl. Specific examples of these sulfur-containing solvents include, but are not limited to, dimethylsulfoxide, dimethylsulfone, diphenylsulfone, diethylsulfoxide, diethylsulfone, diisopropylsulfone, tetrahydrothiophene 1,1-dioxide, and tetrahydrothiophene-1 monoxide.

Additionally, nitrogen containing solvents such as N,N-dimethyl acetamide, N,N-dimethyl formamide and N-methyl pyrrolidinone may be used. These asotrope forming solvents and polar aprotic solvents are used in a weight ratio of about 1:10 to about 1:1 and preferably from about 1:7 to about 1:3.

A chain stopper, such as an aromatic or aliphatic halide is introduced to the reaction to terminate polymerization. The preferred organic halides include methyl chloride or benzyl chloride. These halides convert terminal hydroxyl groups to ether groups and stabilize the polymer.

Other methods for preparing poly(aryl ether sulfones) are available and provide suitable polymers, such as those disclosed in U.S. Pat. No. 3,658,938.

Platinum compounds are often utilized in conjunction with polyorganosiloxane containing compositions in order to enhance the flame retardance of the latter. Platinum complexes are also used as catalysts in certain hydrosilation processes although such catalysts are not necessary for the practice of the present invention. As flame retarding additives, however, there may optionally be utilized the reaction product of chloroplatinic acid and organosilicon compounds as described in U.S. Pat. No. 3,220,972. Another platinum compound is seen in U.S. Pat. No. 3,775,452 describing platinum-containing organopolysiloxanes.

The modified compositions can also be further rendered more flame retardant with effective amounts, e.g., between about 1 and 30 parts by weight per 100 parts by weight of resin, of a flame retardant agent, e.g., elementary red phosphorous, phosphorous compounds, halogen compounds, nitrogen compounds, antimony oxide, zinc oxide, metal salt(s) of sulfonated diphenylsulfone, metal salt(s) of trichlorobenzene-sulfonic acid, mixtures thereof and the like.

The polycarbonate resin typically comprises from about 1 to about 99 parts by weight, preferably from about 75 to about 99 parts by weight, and most preferably from about 90 to about 96 parts by weight based upon 100 parts by weight of polycarbonate resin and non-thermally stabilized multi-stage dual graft polyorganosiloxane/polyvinyl-based polymer combined. Correspondingly, the non-thermally stabilized multi-stage dual graft polyorganosiloxane/polyvinyl-based graft polymer typically comprises from about 99 to about 1 parts by weight, preferably from about 25 to about 1 parts by weight, and most preferably from about 10 to about 4 parts by weight on the same basis.

Similarly, the thermoplastic resin typically comprises from about 1 to about 99 parts by weight, preferably from about 75 to about 99 parts by weight, and most preferably from about 90 to about 96 parts by weight based upon 100 parts by weight of thermoplastic resin and thermally stabilized multi-stage polyorganosiloxane/polyvinyl-based graft polymer composition combined. Correspondingly, the thermally stabilized multi-stage polyorganosiloxane/polyvinyl-based graft polymer typically comprises from about 99 to about 1 parts by weight, perferably from aobut 25 to about 1 parts by weight, and most preferably from about 10 to about 4 parts by weight on the same basis.

In addition, reinforcing fillers; dyes and colored pigments; heat stabilizers; thermooxidative stabilizers and UV stabilizers; waxes, lubricants and processing assistants, which ensure trouble-free extrusion and injection molding; and antistatic agents may be added to the molding compositions according to the invention.

Conventional processes for mixing thermoplastic polymers can be used for the manufacture of molding compositions within the invention. For example, the compositions can be manufactured by using any suitable mixing equipment, e.g., co-kneaders or extruders. The mixing temperatures are in general from 150° to 370° C., preferably from 200° to 345° C. The polymers are fused and thoroughly mixed, with or without the other additives described.

The addition of the graft copolymers described above does not adversely influence the processing stability of the thermoplastically processable plastics material. The processing of the new molding compositions by extrusion or injection molding is preferably carried out at from 200° C. to 330° C., with the mold, in the latter case, being at from 50° C. to 150° C., and cycle times preferably but posssibly longer of less than two minutes. The thermally stabilized graft copolymer modifier allows for retention and improvement of properties as described above at considerably higher temperatures and under abusive molding compositions, though.

Special mention is made of articles molded, extruded or thermoformed from any of the above graft polymers or modified thermoplastic compositions. These can be prepared by conventional methods.

DESCRIPTION OF THE PREFERRED EMBODIMENTS

The following examples illustrate the invention without limitation. All parts given are by weight unless otherwise indicated. Impact strengths are reported as notched Izod (NI) according to ASTM D-256, unnotched Izod, Dynatup and ductility. Color is reported as YIR and Gloss at 60° C.

EXAMPLES

The following abbreviations are used in accordance with the following tables in the following examples:

Si=general term for organosiloxanes includes D4, VMD4, VTMOS, TEOS, APTMOS, etc.

D4=octamethylcyclotetrasiloxane

VMD4=tetramethyltetravinylcyclotetrasiloxane

VTMOS=vinyltrimethoxysilane

TEOS=tetraethoxysilane

APTMOS=gamma-methacryloxypropyltrimethoxysilane

S=styrene

AN=acrylonitrile

MMA=methyl (meth)acrylate

EA=ethyl acrylate

DVB=divinylbenzene

A single slash is used between monomers of a single stage and a double slash or a hyphen is used as a shorthand method indicating separation between stages. The first stage to be polymerized is written first before the double slash or hyphen, and subsequent stages are written subsequently.

PROCEDURE A

Octamethylcyclotetrasiloxane (D4), 74.59 parts, tetravinyltetramethyltetravinylcyclotetrasiloxane (VMD4), 3.52 parts, tetraethoxysilane (TEOS), 8.67 parts, methacryloxypropyltrimethoxysilane (APTMOS), 1.22 parts, are mixed together. A mixture of styrene (S), 11.76 parts, and divinylbenzene (DVB), 0.24 parts, is thereafter added. The organic mixture is then added to deionized water, 235.7 parts, containing 1.23 parts dissolved dodecylbenzene-sulfonic acid. The final stirred mixture is then homogenized twice at a pressure of 6000–8000 psi. The crude emulsion is then polymerized at 75° C. for six hours using potassium persulfate, 0.06 part, as the initiator for styrenic polymerization. The silicone/polystyrene (Si/S) first stage emulsion is cooled to room temperature overnight and is then quenched by neutralization from pH 1.7 to 8.1, following an optional addition of 0.29 part of GAFAC® RE 610 surfactant which is predissolved in 2.62 parts of deionized water, yielding a polyorganosiloxane/polyvinyl co-homopolymer having an Si:S weight ratio of 88:12.

PROCEDURE B (Comparative Example 2A*)

15 parts of methyl (meth)acrylate (MMA) monomer, 0.15 parts of allyl methacrylate (AMA), and 0.45 parts of divinyl benzene (DVB) are grafted to 70 parts based on dry rubber of a latex prepared by the method of Procedure A to yield a substrate/second stage intermediate graft polymer ((Si/S)-MMA). Subsequently, 15 parts of styrene and 0.45 parts of DVB are grafted to the resultant substrate/second stage intermediate yielding the CSIM modifier ((Si/S)-MMA-S-weight ratio of 69.3:15.4:15.3, MMA-S weight ratio of 50:50). The CSiM modifier is dried either under vacuum or in a fluidized bed drier for several hours at 60°–90° C.

Thermal stability is illustrated in FIG. 2.

PROCEDURE C (Comparative Example 3A*)

30 parts of methyl (meth)acrylate/styrene (MMA/S) (weight ratio of 50:50) comonomer and 0.9 parts of DVB are grafted to 70 parts based on dry rubber of a latex prepared by the method of Procedure A yielding the CSiM modifier ((Si/S)-MMA/S, weight ratio of 69.4:30.6, MMA/S weight ratio of 50:50). The CSiM modifier is dried either under vacuum or in a fluidized bed drier for several hours at 60°–90° C.

Thermal stability is illustrated in FIG. 2.

PROCEDURE D (Comparative Example 4A*)

30 parts of methyl (meth)acrylate/styrene (MMA/S) (weight ratio of 90:10), and 0.9 parts of DVB comonomer are grafted to 70 parts based on dry rubber of a latex prepared by the method of Procedure A yielding the CSiM modifier ((Si/S)-MMA/S, weight ratio of 69.4:30.4, MMA/S weight ratio of 90:10). The CSiM modifier is dried either under vacuum or in a fluidized bed drier for several hours at 60° C.–90° C.

Thermal stability is illustrated in FIG. 2.

PROCEDURE E (Comparative Example 5A*)

30 parts of methyl (meth)acrylate/acrylonitrile (weight ratio of 95:5) comonomer and 0.9 parts of DVB are grafted to 70 parts based on dry rubber of a latex prepared by the method of Procedure A yielding the CSiM modifier ((Si/S)-MMA/AN, weight ratio of 69.4:30.6, MMA/AN weight ratio of 95:5). The CSiM modifier is dried either under vacuum or in a fluidized bed drier for several hours at 60°–90° C.

Thermal stability is illustrated in Table 2.

PROCEDURE F (Comparative Example 6A*)

30 parts of methyl (meth)acrylate/ethyl acrylate (weight ratio of 90:10) comonomer and 0.9 parts of DVB are grafted to 70 parts based on dry rubber of a latex prepared by the method of Procedure A yielding the CSiM modifier ((Si/S)-MMA/EA, weight ratio of 69.4:30.6, MMA/EA weight ratio of 95:5). The CSiM modifier is dried either under vacuum or in a fluidized bed drier for several hours at 60°–90° C.

Thermal stability is illustrated in FIG. 2.

PROCEDURE G (Comparative Example 7A*)

30 parts of methyl (meth)acrylate monomer and 0.9 parts of DVB are grafted to 70 parts based on dry rubber of a latex prepared by the method of Procedure A yielding the CSiM modifier ((Si/S)-MMA, weight ratio of 69.4:30.6). The CSiM modifier is dried either under vacuum or in a fluidized bed drier for several hours at 60°–90° C.

Thermal stability is illustrated in FIG. 2.

Example 1

A dry blend of 95.2 parts of polycarbonate resin (poly (bisphenol-A carbonate)—Lexan® RL5221—General Electric Co.—Pittsfield, Mass.), 4.75 parts of the CSiM modifier prepared by the method of Procedure B, and 0.05 part of stabilizer are mixed and they are extruded on a 30 mm TWIN extruder operating at 300 rpm with barrel zones at 550° C. and are pelletized. Samples are molded on an 85 ton Van Dorn machine, with mold temperatures at 570° F. and 605° F. with a 30 second cycle; and 605° F. and 640° F. with a two minute cycle.

Properties are summarized in Table 1.

Comparative Example 1A*

The procedure of Example 1 is followed substituting the CSIM prepared by the method of Procedure C.

Properties are summarized in Table 1.

Comparative Example 1B*

The procedure of Example 1 is followed substituting the CSiM prepared by the method of Procedure D.

Properties are summarized in Table 1.

Comparative Example 1C*

The procedure of Example 1 is followed substituting the CSiM prepared by the method of Procedure E.

Properties are summarized in Table 1.

Comparative Example 1D*

The procedure of Example 1 is followed substituting the CSiM prepared by the method of Procedure F.
Properties are summarized in Table 1.

Comparative Example 1E*

The procedure of Example 1 is followed substituting the CSiM prepared by the method of Procedure G.
Properties are summarized in Table 1.

Example 1 when compared with Comparative Examples 1A*–1E* demonstrates the high ductility, particularly at low temperatures of modified polycarbonate compositions within the scope of the present invention. Example 1 remains ductile particularly at temperatures of −10° C. and below and most particularly at −30° C. and below. Example 1 even remains ductile at temperatures as low as −50° C. under certain molding conditions. Impact strength is improved at low temperatures as well.

TABLE 1

Polycarbonate-Polyorganosiloxane/Polyvinyl-Based Dual Graft Polymer Compositions

| EXAMPLE | 1 | 1A* | 1B* | 1C* | 1D* | 1E* |
|---|---|---|---|---|---|---|
| Composition | | | | | | |
| Polycarbonate[a] | 95.2 | 95.2 | 95.2 | 95.2 | 95.2 | 95.2 |
| CSiM | 4.75[b] | 4.75[c] | 4.75[d] | 4.75[e] | 4.75[f] | 4.75[g] |
| Stabilizer | 0.05 | 0.05 | 0.05 | 0.05 | 0.05 | 0.05 |
| Properties | | | | | | |
| @ 570° F. Molding Temp. | | | | | | |
| YIR | 4.2 | 4.2 | 4.4 | 6.0 | 3.3 | 3.7 |
| Gloss (60°) | 105 | 83 | 106 | 99 | 104 | 106 |
| KI 6 min. @ 250° C. | 10690 | 10940 | 10630 | 10850 | 10860 | 10650 |
| KI 6 min. @ 250° C., Part | 10610 | 10620 | 10470 | 10500 | 10580 | 10660 |
| Specific Gravity | 1.188 | 1.188. | 1.188 | 1.189 | 1.189 | 1.189 |
| Notched Izod (⅛″) f-lb/in (% ductile) @ 25° C. | 12.0(100) | 11.6(100) | 12.7(100) | 11.5(100) | 11.7(100) | 11.9(100) |
| −30° C. | 11.0(100) | 10.7(100) | 10.2(100) | 9.7(80) | 10.7(100) | 10.4(100) |
| −40° C. | —(-) | 8.0(0) | 9.0(60) | 9.2(40) | 10.0(60) | 9.8(40) |
| −50° C. | 10.2(100) | 7.7(0) | 9.3(0) | 7.5(0) | 9.1(0) | 8.6(0) |
| −60° C. | 7.7(0) | —(-) | —(-) | —(-) | —(-) | —(-) |
| Unnotched Izod (⅛″) ft-lb/in (% ductile) @ 25° C. | 52.1(100) | 50.8(100) | 50.8(100) | 48.6(100) | 52.2(100) | 52.5(100) |
| Doublegated izod (⅛″) ft-lb/in (% ductile) @ 25° C. | 31.2(100) | 25.4(100) | 34.7(100) | 28.4(100) | 28.1(100) | 34.8(100) |
| Notched Izod (¼″) ft-lb/in (% ductile) @ 25° C. | 10.8(100) | 9.5(100) | 10.0(100) | 10.1(100) | 10.3(100) | 10.0(100) |
| 0° C. | 8.3(100) | 8.1(100) | 9.2(100) | 8.4(100) | 8.6(100) | 8.8(100) |
| −10° C. | 8.2(100) | 6.9(0) | 6.9(40) | 7.2(40) | 7.7(20) | 7.6(60) |
| −20° C. | 7.2(0) | 6.4(0) | 5.9(0) | 6.0 (0) | 7.1(0) | 6.5(0) |
| −30° C. | 6.6(0) | 6.4(0) | 5.5(0) | 5.6 (0) | 5.7(0) | 5.6(0) |
| Unnotched Izod (¼″) ft-lb/in(% ductile) @ 25° C. | NB | NB | NB | NB | NB | NB |
| Dynatup Plaque Impact Energy ft-lb (% ductile) | | | | | | |
| @ Max Load @ 25° C. | 51.0 | 45.6 | 41.4 | 46.9 | 45.8 | 45.6 |
| Total 25° C. | 53.6(100) | 46.6(100) | 43.9(100) | 48.0(100) | 47.7(100) | 47.3(100) |
| @ Max Load −30° C. | — | 44.8 | 35.4 | 46.9 | — | — |
| Total −30° C. | —(-) | 46.1(100) | 36.7(66) | 48.9(100) | —(-) | —(-) |
| @ Max Load −40° C. | — | 45.7 | 34.8 | 39.8 | 44.5 | — |
| Total −40° C. | —(-) | 47.9(0) | 38.2(66) | 40.6(66) | 48.7(100) | —(-) |
| @ Max Load −50° C. | 52.5 | 52.0 | 44.7 | 43.4 | 53.2 | 49.6 |
| Total −50° C. | 53.7(100) | 53.2(33) | 47.0(33) | 45.7(33) | 55.0(66) | 50.9(100) |
| @ 665° F. Molding Temp. | | | | | | |
| YIR | 4.6 | 4.4 | 4.0 | 5.9 | 3.9 | 4.0 |
| Gloss (60°) | 106 | 95 | 107 | 104 | 107 | 107 |
| KI 6 min. @ 250° C., Part | 10350 | 10900 | 10250 | 10730 | 10400 | 10290 |
| Specific Gravity | 1.190 | 1.189 | 1.189 | 1.188 | 1.189 | 1.189 |
| Notched Izod (⅛″) ft-lb/in(% ductile) @ 25° C. | 12.3(100) | 12.0(100) | 12.8(100) | 12.1(100) | 12.2(100) | 12.8(100) |
| −30° C. | —(-) | 9.4(60) | 9.2(100) | 9.6(100) | 10.0(100) | 9.6(100) |
| −40° C. | 9.7(100) | 6.5(0) | 8.4(20) | 7.4(20) | 9.0(0) | 8.5(20) |

TABLE 1-continued

Polycarbonate-Polyorganosiloxane/Polyvinyl-Based Dual Graft Polymer Compositions

| EXAMPLE | 1 | 1A* | 1B* | 1C* | 1D* | 1E* |
|---|---|---|---|---|---|---|
| −50° C. | 8.6(0) | 6.4(0) | 7.5(0) | 7.1(0) | 6.8(0) | 8.1(0) |
| Unnotched Izod (⅛") ft-lb/in(% ductile) @ 25° C. | 51.9(100) | 51.5(100) | 52.8(100) | 49.5(100) | 53.5(100) | 49.8(100) |
| Doublegated Izod(⅛") ft-lb/in(% ductile) @ 25° C. | 30.6(100) | 27.1(100) | 33.1(100) | 30.0(100) | 33.4(100) | 35.1(100) |
| Notched Izod(¼") ft-lb/in(% ductile) @ 25° C. | 9.7(100) | 9.3(100) | 9.8(100) | 9.7(100) | 9.9(100) | 10.1(100) |
| 0° C. | —(-) | 7.1(80) | 8.2(100) | —(-) | 8.0(100) | 7.5(60) |
| −10° C. | 7.7(100) | 6.3(0) | 7.1(20) | 6.9(0) | 7.4(80) | 7.0(40) |
| −25° C. | 6.4(0) | 5.6(0) | 5.8(0) | 5.7(0) | 6.1(0) | 5.9(0) |
| Unnotched Izod(¼") @ 25° C. | 36.0(80) | 39.7(100) | 39.6(100) | 39.7(100) | 37.7(100) | 37.1(80) |
| Dynatup Plaque Impact Energy ft-lb(% ductile) | | | | | | |
| @ Max Load @ 25° C. | 45.2 | 38.3 | 41.7 | 40.9 | 49.6 | 38.8 |
| Total 25° C. | 46.2(100) | 39.6(100) | 42.8(100) | 46.8(100) | 50.6(100) | 43.6(100) |
| @ Max Load −30° C. | — | 44.4 | 49.1 | 48.1 | 47.6 | — |
| Total −30° C. | —(-) | 45.7(33) | 50.5(66) | 49.2(100) | 50.8(100) | —(-) |
| @ Max Load −40° C. | — | 48.1 | 49.9 | 46.7 | 47.1 | — |
| Total −40° C. | —(-) | 49.7(33) | 51.9(66) | 48.2(66) | 50.3(66) | —(-) |
| @ Max Load −50° C. | 57.1 | 39.3 | 43.8 | 44.0 | 32.3 | 52.1 |
| Total −50° C. | 58.0(100) | 40.3(33) | 46.5(33) | 45.9(33) | 40.6(66) | 53.6(100) |
| @ 605° F. Molding Temp. 2 min cycle | | | | | | |
| YIR | 21.7 | 19.0 | 18.6 | 28.0 | 20.4 | 20.2 |
| Gloss (60°) | 68 | 54 | 64 | 51 | 83 | 57 |
| KI 6 min. @ 250° C., Part | 7340 | 7960 | 6100 | 6840 | 6200 | 6130 |
| Specific Gravity | 1.189 | 1.188 | 1.190 | 1.189 | 1.188 | 1.189 |
| Notched Izod(⅛") ft-lb/in(% ductile) @ 25° C. | 10.7(100) | 10.0(100) | 9.4(40) | 8.9(80) | 8.7(60) | 10.5(100) |
| 10° C. | —(-) | —(-) | —(100) | —(100) | —(100) | —(100) |
| 0° C. | 7.3(20) | 5.5(0) | 5.0(0) | 4.7(0) | 4.8(0) | 5.5(0) |
| −10° C. | 5.3(0) | 4.8(0) | 4.7(0) | 4.5(0) | 4.1(0) | 4.7(0) |
| @ 640°F. Molding Temp. 2 min cycle | | | | | | |
| YIR | 42.0 | 36.9 | 38.1 | 37.3 | 37.5 | 40.4 |
| Gloss (60°) | 37 | 32 | 45 | 41 | 45 | 60 |
| KI 6 min. @ 250° C., Part | 3300 | 3000 | 4770 | 2620 | 2550 | 4350 |
| Specific Gravity | 1.188 | 1.188 | 1.189 | 1.189 | 1.188 | 1.192 |
| Notched Izod(⅛") ft-lb/in(% ductile) @ 25° C. | 4.3(0) | 4.5(0) | 2.1(0) | 1.2(0) | 0.8(0) | 0.4(0) |

[a] Poly(bisphenol-A carbonate) - Lexan ® RL5221 - General Electric Co. - Pittsfield, MA.
[b] (Si/S)—MMA—S, substrate wt. ratio of Si:S of 88:12, wt. ratio of MMA:S of 50:50, wt. ratio of(Si/S):MMA—S of 69.3:30.7 - Procedure B.
[c] (Si/S)—MMA/S, substrate wt. ratio of Si:S of 88:12, wt. ratio of MMA:S of 50:50, wt. ratio of(Si/S):MMA/S of 69.4:30.6 - Procedure C.
[d] (Si/S)—MMA/S, substrate wt. ratio of Si:S of 88:12, wt. ratio of MMA:S of 90:10, wt. ratio of(Si/S):MMA/S of 69.4:30.6 - Procedure D.
[e] (Si/S)—MMA/AN, substrate wt. ratio of Si:S of 88:12, wt. ratio of MMA:AN of 95:5, wt. ratio of(Si/S):MMA/AN of 69.4:30.6 - Procedure E.
[f] (Si/S)—MMA/EA, substrate wt. ratio of Si:S of 88:12, wt. ratio MMA:EA of 90:10, wt. ratio of(Si/S):MMA/EA of 69.4:30.6 - Procedure F.
[g] (Si/S)—MMA, substrate wt. ratio of Si:S of 88:12, wt. ratio of Si/S:MMA of 69.4:30.6 - Procedure G.

Example 2

The CSIM of Procedure B is superdried for an additional two hours at 250° F. The superdrying results in a weight loss of 1 to 2 percent. Its thermal stability is illustrated in FIG. 2. by ISO-DSC measurement.

Example 3

The CSiM of Procedure C is superdried for an additional two hours at 250° F. Its thermal stability is illustrated in FIG. 2. by ISO-DSC measurement Example 4

The CSiM of Procedure D is superdried for an additional two hours at 250° F. The superdrying results in a weight loss of 1 to 2 percent. Its thermal stability is illustrated in FIG. 2. by ISO-DSC measurements.

Example 5

The CSiM of Procedure E is superdried for an additional two hours at 250° F. The superdrying results in a weight loss of 1 to 2 percent. Its thermal stability is illustrated in FIG. 2. by ISO-DSC measurements.

Example 6

The CSIM of Procedure F is superdried for an additional two hours at 250° F. The superdrying results in a weight loss of 1 to 2 percent. Its thermal stability is illustrated in FIG. 2.

Example 7

The CSiM of Procedure G is dried for an additional two hours at 250° F. The additional drying results in a weight loss of 1 to 2 percent. Its thermal stability is illustrated in FIG. 2.

Comparative Example 8*

Si/Si Substrate was isolated from the emulsion (prepared according to Procedure A) and vacuum dried to a constant weight at 60 degrees C.

Examples 2–7, when compared with Comparative Examples 2A*–7A* (Procedures B–G), demonstrate the improved impact properties imparted to thermally stabilized CSiM modifier by superdrying. Particularly, the thermally stabilized modifiers are 100 percent ductile at room temperature and have increased notched Izod strength over the non-thermally stabilized material.

Finally, FIG. 2, which illustrates melt stability of the thermally stabilized modifier measured by isothermal TGA, shows that weight retained after 15 minutes at 300° C. improves to 98–99+ percent after superdrying (Examples 2–7) compared to 60–70 percent in the non-thermally stabilized modifier (Comparative Examples 2A*–7A* (Procedures B–G)).

The finding that the superdrying in Examples 2–7 results only in a 1–2 percent weight loss in the modifier indicates that the superdrying at a higher temperature than the drying in the preparation of the modifiers of Comparative Examples 2A*–7A* (Procedures B–G) actually improves the thermal stability of the CSiM modifiers.

Example 9

A dry blend of 95.2 parts of polycarbonate resin (poly (bisphenol-A carbonate)—Lexan® RL5221—General Electric Co.), 4.75 parts of the CSiM modifier prepared by the method of Example 2, and 0.05 part of stabilizer are mixed and extruded in an 30 mm TWIN extruder operating at 300 rpm with barrel zones at 550° C., and are pelletized. Samples are molded on a molder with mold temperature at 640° C. with a 2 minute cycle.

Properties are illustrated in Table 2.

Example 10

The procedure of Example 2 is followed substituting CSiM prepared by the method of Example 3.

Properties are summarized in Table 2.

Example 11

The procedure of Example 2 is followed substituting the CSiM prepared by the method of Example 4.

Properties are summarized in Table 2.

Example 12

The procedure of Example 2 is followed substituting the CSiM prepared by the method of Example 5.

Properties are summarized in Table 2.

Example 13

The procedure of Example 2 is followed substituting the CSiM prepared by the method of Example 6.

Properties are summarized in Table 2.

Example 14

The procedure of Example 2 is followed substituting the CSiM prepared by the method of Example 7.

Properties are summarized in Table 2.

Examples 9–14 demonstrate the good thermal stability of the thermally stabilized CSiM modifier of the present invention under abusive molding conditions. Particularly when Example 9 is compared with Example 1, Example 10 with Comparative Example 1A*, Example 11 with Comparative Example 1B*, Example 12 with Comparative Example 1C*, Example 13 with Comparative Example 1D*, and Example 14 with Comparative Example 1E*, the impact strength and ductility are improved under abusive molding conditions.

TABLE 2

Polycarbonate-Thermally Stabilized Polyorganosiloxane/Polyvinyl-Based Polymer Compositions

| EXAMPLE | 9 | 10 | 11 | 12 | 13 | 14 |
|---|---|---|---|---|---|---|
| Composition | | | | | | |
| Polycarbonate[a] | 95.2 | 95.2 | 95.2 | 95.2 | 95.2 | 95.2 |
| CSiM | 4.75[b] | 4.75[c] | 4.75[d] | 4.75[e] | 4.75[f] | 4.75[g] |
| Stabilizer | 0.05 | 0.05 | 0.05 | 0.05 | 0.05 | 0.05 |
| Properties | | | | | | |
| @ 640° F. Molding Temp. | | | | | | |
| 2 min cycle | | | | | | |
| YIR | 13.4 | 7.6 | 8.9 | 13.0 | 11.6 | 4.5 |
| Gloss (60°) | 84 | 53 | 91 | 60 | 75 | 90 |
| KI 6 min. @ 250° C. | 10780 | 11320 | 11180 | 11280 | 10800 | 10820 |

TABLE 2-continued

Polycarbonate-Thermally Stabilized
Polyorganosiloxane/Polyvinyl-Based Polymer Compositions

| EXAMPLE | 9 | 10 | 11 | 12 | 13 | 14 |
|---|---|---|---|---|---|---|
| KI 6 min. @ 250° C., Part | 87700 | 9040 | 8260 | 8380 | 83800 | 83300 |
| Specific Gravity | 1.189 | 1.190 | 1.190 | 1.191 | 1.191 | 1.190 |
| Notched Izod (1/8") ft-lb/in(% ductile) @ 25° C. | 9.8(100) | 5.9(20) | 10.3(100) | 3.5(0) | 10.3(100) | 10.1(100) |
| 10° C. | 4.0(40) | 2.4(0) | 7.7(40) | 1.5(0) | 5.4(60) | 9.1(100) |
| 0° C. | 7.4(40) | 4.5(0) | 7.3(60) | —(−) | 7.6(40) | 8.0(80) |
| −20° C. | 3.9(0) | 3.5(0) | 4.1(0) | 2.7(0) | 5.0(0) | 5.0(0) |

[a]Poly(bisphenol-A carbonate) - Lexan ® RL5221 - General Electric Co. - Pittsfield, MA.
[b](Si/S)—MMA—S, substrate wt. ratio of Si:S of 88:12, wt. ratio of MMA:S of 50:50, wt. ratio of (Si/S):MMA—S of 60.3:30.7 - Procedure B.
[c](Si/S)—MMA/S, substrate wt. ratio of Si:S of 88:12, wt. ratio of MMA:S of 50:50, wt. ratio of (Si/S):MMA/S of 60.4:30.6 - Procedure C.
[d](Si/S)—MMA/S, substrate wt. ratio of Si:S of 88:12, wt. ratio of MMA:S of 90:10, wt. ratio of (Si/S):MMA/S of 60.4:30.6 - Procedure D.
[e](Si/S)—MMA/AN, substrate wt. ratio of Si:S of 88:12, wt. ratio of MMA:AN of 95:5, wt. ratio of (Si/S):MMA,/AN of 60.4:30.6 - Procedure E.
[f](Si/S)—MMA/EA, substrate wt. ratio of Si:S of 88:12, wt. ratio MMA:EA of 90:10, wt. ratio of (Si/S):MMA/EA of 60.4:30.6 - Procedure F.
[g](Si/S)—MMA, wt. ratio of Si:S of 88:12, wt. ratio of Si/S:MMA of 60.4:30.6 - Procedure G.

All patents and applications mentioned above are hereby incorporated by reference.

Many variations of the present invention will suggest themselves to those skilled in this art in light of the above, detailed description. For example, glass fibers can be used to reinforce the compositions and polybrominated diphenyl ether can be used to make them flame retardant. All such obvious variations are within the full intended scope of the appended claims.

We claim:

1. A thermally stabilized multi-stage polyorganosiloxane/polyvinyl-based graft polymer composition having improved color-imparting and impact-imparting properties comprising
    (a) as a first stage, a substrate selected from:
        (i) a polymeric co-homopolymerized substrate comprised of, in combination, an organo-siloxane polymer and at least one vinyl-based polymer;
        (ii) a polymeric co-homopolymerized substrate comprised of, in combination, an organo-siloxane polymer, at least one vinyl-based polymer, and units which are derived from a cross-linking agent or agents;
        (iii) a polymeric co-homopolymerized substrate comprised of, in combination, an organo-siloxane polymer, at least one vinyl-based polymer, and units which serve as a graft-linking agent or agents;
        (iv) a polymeric co-homopolymerized substrate comprised of, in combination, an organo-siloxane polymer, at least one vinyl-based polymer, units which are derived from a cross-linking agent or agents and units from the same or different agent or agents which serve as a graft-linking agent or agents; or
        (v) a polymeric co-homopolymerized substrate comprised of, in combination, an organo-siloxane polymer, at least one vinyl-based polymer, and a mixture of any of units which are derived from a cross-linking agent or agents, units which serve as a graft-linking agent or agents, or units derived from a cross-linking agent or agents and units from the same or different agent or agents which serve as a graft-linking agent or agents; and
    (b) at least one subsequent stage or stages graft polymerized in the presence of any previous stage and which is comprised of a vinyl-based polymer or a cross-linked vinyl-based polymer;
    said graft polymer being superdried.

2. A composition as defined in claim 1 wherein said organosiloxane/vinyl-based co-homopolymer first stage substrate (a) comprises approximately 5 to 95 weight percent of the total graft polymer composition based upon the weight of said first stage substrate and any subsequent graft stages taken together.

3. A composition as defined in claim 1 wherein said organosiloxane polymer comprising a mixture of at least three units of the formula

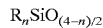

$$R_nSiO_{(4-n)/2}$$

wherein R is hydrogen or a monovalent hydrocarbon radical of about 1 to 16 carbon atoms and n is 0, 1 or 2.

4. A composition as defined in claim 1 wherein the vinyl-based polymer component of said first stage substrate (a) is comprised primarily of polymerized alkenyl aromatic units, (meth)acrylate units or a mixture thereof.

5. A composition as defined in claim 1 wherein the vinyl-based polymer in any subsequent stage (b) includes monomers selected from the group consisting of alkenyl aromatic compounds, (meth)acrylate compounds, vinyl cyanide compounds, maleimide compounds, acrylamide compounds or combinations of any of the foregoing.

6. A composition as defined in claim 1 wherein said subsequent stages comprise
    (b)(i) a second stage comprising at least one polymer and optionally units which are derived from a cross-linking agent or agents, units which serve as a graft-linking agent or agents, units derived from a cross-linking agent or agents and units from the same or different agent or agents which serve as a graft-linking agent or agents, or a mixture of any of the foregoing; and
    (b)(ii) a third stage comprising at least one vinyl-based polymer or cross-linked vinyl-based polymer which is the same as, or different than, said (b)(i) polymer.

7. A composition as defined in claim 6 wherein subsequent stage (b)(i) comprises poly(methyl(meth)acrylate) and subsequent stage (b)(ii) comprises a styrene/acrylonitrile copolymer.

8. A process for producing a thermally stabilized multi-stage polyorganosiloxane/polyvinyl-based graft polymer comprising the steps of:
   (i) providing a first stage substrate by the concurrent co-homopolymerization of
      (1) an organosiloxane and one or more vinyl-based monomers;
      (2) an organosiloxane, one or more vinyl-based monomers, and units which are derived from a cross-linking agent or agents;
      (3) an organosiloxane, one or more vinyl-based monomers, and units which serve as a graft-linking agent or agents;
      (4) an organosiloxane, one or more vinyl-based monomers, units which are derived from at least one cross-linking agent or agents and units of the same or different agent or agents which serve as a graft-linking agent or agents; or
      (5) an organosiloxane, one or more vinyl-based monomers, and a mixture of any of units which are derived from a cross-linking agent or agents, units which serve as a graft-linking agent or agents, or units derived from a cross-linking agent or agents and units from the same or different agent or agents which serve as a graft-linking agent or agents;
   (ii) neutralizing the reaction mass of the foregoing polymerization step to a pH of at least about 6.5 to provide a neutralized polyorganosiloxane/polyvinyl-based substrate latex;
   (iii) graft polymerizing at least one vinyl-based monomer in a subsequent stage in the presence of said polyorganosiloxane/polyvinyl-based substrate thereby providing a multi-stage polyorganosiloxane/polyvinyl-based graft polymer;
   (iv) drying said multi-stage polyorganosiloxane/polyvinyl-based graft polymer thereby providing a dried multi-stage polyorganosiloxane/polyvinyl-based graft polymer; and
   (v) superdrying said dried multi-stage polyorganosiloxane/polyvinyl-based graft polymer thereby providing said thermally stabilized multi-stage polyorganosiloxane/polyvinyl-based graft polymer.

9. A process as defined in claim 8 wherein step (iv) is carried out for a period of from about 1½ to about 2½ hours at a temperature of about 100° C. to about 150° C.

10. A process as defined in claim 8 wherein graft polymerization step (iii) is carried out in two successive stages comprising:
   (1) graft polymerizing at least one vinyl-based monomer; or vinyl-based monomer in admixture with a cross-linker, a graft-linker, or a cross- and graft-linker or a mixture of the foregoing to produce a second stage of polymer or cross-linked polymer on said substrate; and thereafter,
   (2) graft polymerizing at least one vinyl-based monomer or a monomer and a cross-linker which is the same as or different than that used in step (iii)(1) to produce a third stage of polymer on said second stage.

11. A process as defined in claim 10 wherein the polymer for the second stage is produced by polymerizing butyl acrylate, a cross-linker or optionally a graft-linker, and the polymer for the third stage is produced by polymerizing styrene and acrylonitrile.

12. A process as defined in claim 8 further comprising the step of isolating said thermally stabilized multi-stage organosiloxane/vinyl-based graft polymer to provide a thermally stabilized polyorganosiloxane/polyvinyl-based modifier for thermoplastic resins.

13. A process as defined in claim 10 further comprising the step of isolating said thermally stabilized multi-stage polyorganosiloxane/vinyl-based graft polymer to provide a thermally stabilized multi-stage polyorganosiloxane/polyvinyl-based modifier for thermoplastic resins.

14. A process as defined in claim 12 further comprising the step of combining a color and impact strength modifying amount of said thermally stabilized multi-stage polyorganosiloxane/polyvinyl-based modifier with a thermoplastic resin.

15. A composition produced by a process as defined in claim 8.

* * * * *